(12) United States Patent
Koudas et al.

(10) Patent No.: US 8,131,792 B1
(45) Date of Patent: *Mar. 6, 2012

(54) APPARATUS AND METHOD FOR CORRELATING SYNCHRONOUS AND ASYNCHRONOUS DATA STREAMS

(75) Inventors: Nikolaos Koudas, Florham Park, NJ (US); Sudipto Guha, Philadelphia, PA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 927 days.

This patent is subject to a terminal disclaimer.

(21) Appl. No.: 12/125,973

(22) Filed: May 23, 2008

Related U.S. Application Data

(63) Continuation of application No. 10/822,316, filed on Apr. 12, 2004, now Pat. No. 7,437,397.

(60) Provisional application No. 60/461,910, filed on Apr. 10, 2003.

(51) Int. Cl.
*G06F 17/15* (2006.01)
*G06F 11/00* (2006.01)
*G06F 12/14* (2006.01)
*G06F 12/16* (2006.01)
*G08B 23/00* (2006.01)

(52) U.S. Cl. .......................................... 708/422; 726/22
(58) Field of Classification Search ........... 708/422–426
See application file for complete search history.

(56) References Cited

U.S. PATENT DOCUMENTS

| 7,437,397 B1 * | 10/2008 | Koudas et al. | 708/422 |
| 7,475,027 B2 * | 1/2009 | Brand | 705/7.29 |
| 2003/0200097 A1 * | 10/2003 | Brand | 704/500 |

OTHER PUBLICATIONS

Guha et al., "Approximating a Data Stream for Querying and Estimation: Algorithms and Performance Evaluation", pp. 1-10, Feb 2002.*
Sudipto Guha, D. Gunopulos, and Nick Koudas, "Correlating synchronous and asynchronous data streams", In Proceedings of the ninth ACM SIGKDD international conference on Knowledge discovery and data mining, pp. 529-534, 2003.*
M. Brand, "Fast online SVD revisions for lightweight recommender systems", in SDM, pp. 37-48, 2003.*

* cited by examiner

*Primary Examiner* — Lewis Bullock, Jr.
*Assistant Examiner* — Matthew Sandifer
(74) *Attorney, Agent, or Firm* — Akerman Senterfitt; Michael K. Dixon; Roy Zachariah

(57) ABSTRACT

Certain exemplary embodiments provide a method comprising: automatically: receiving a plurality of elements for each of a plurality of continuous data streams; treating the plurality of elements as a first data stream matrix that defines a first dimensionality; reducing the first dimensionality of the first data stream matrix to obtain a second data stream matrix; computing a singular value decomposition of the second data stream matrix; and based on the singular value decomposition of the second data stream matrix, quantifying approximate linear correlations between the plurality of elements.

18 Claims, 12 Drawing Sheets

APPARATUS AND METHOD FOR CORRELATING SYNCHRONOUS AND ASYNCHRONOUS DATA STREAMS

CROSS-REFERENCE TO RELATED APPLICATIONS

This application is a continuation of, claims priority to, and incorporates by reference herein in its entirety, pending U.S. patent application Ser. No. 10/822,316, filed 12 Apr. 2004, which is a Non-Provisional of U.S. Provisional Patent Application Ser. No. 60/461,910, filed 10 Apr. 2003.

SUMMARY

Certain exemplary embodiments provide a method comprising: automatically: receiving a plurality of elements for each of a plurality of continuous data streams; treating the plurality of elements as a first data stream matrix that defines a first dimensionality; reducing the first dimensionality of the first data stream matrix to obtain a second data stream matrix; computing a singular value decomposition of the second data stream matrix; and based on the singular value decomposition of the second data stream matrix, quantifying approximate linear correlations between the plurality of elements.

BRIEF DESCRIPTION OF THE DRAWINGS

A wide variety of potential embodiments will be more readily understood through the following detailed description, with reference to the accompanying drawings in which.

DEFINITIONS

Figure 1:
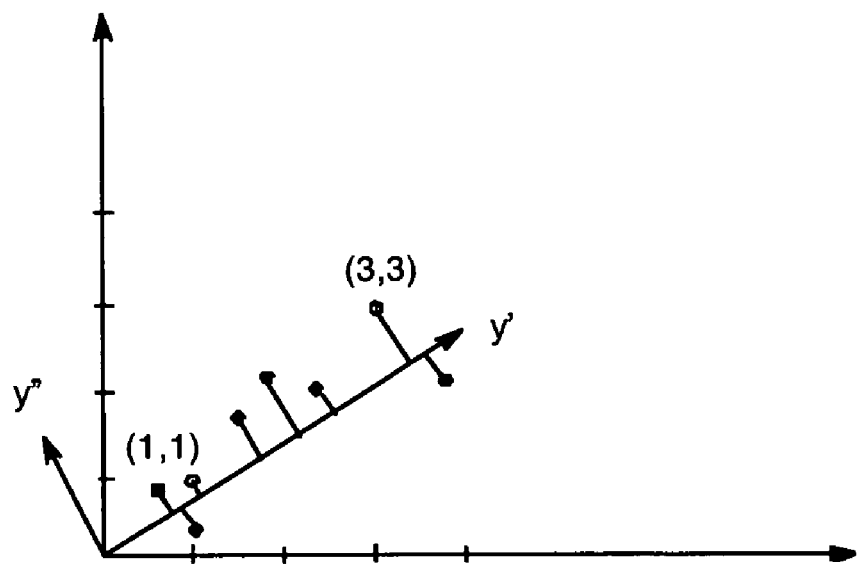
FIG. 1 is a plot of an exemplary set of linearly correlated data points.

When the following terms are used herein, the accompanying definitions apply:

database—an organized collection of information. A database can comprise a mirror of a primary database. For example, an ALI database can comprise a mirror of a primary ALI database.

firmware—machine-readable instructions that are stored in a read-only memory (ROM). ROM's can comprise PROMs and EPROMs.

haptic—both the human sense of kinesthetic movement and the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

information device—any device capable of processing information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Handspring Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can include well-known components such as one or more network interfaces, one or more processors, one or more memories containing instructions, and/or one or more input/output (I/O) devices, one or more user interfaces, etc.

Internet—an interconnected global collection of networks that connect information devices.

I/O device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

memory device—any device capable of storing analog or digital information, for example, a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and can store instructions adapted to be executed by the processor according to an embodiment disclosed herein.

network interface—any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

processor—a device for processing machine-readable instruction. A processor can be a central processing unit, a local processor, a remote processor, parallel processors, and/or distributed processors, etc. The processor can be a general-purpose microprocessor, such the Pentium III series of microprocessors manufactured by the Intel Corporation of Santa Clara, Calif. In another embodiment, the processor can be an Application Specific Integrated Circuit (ASIC) or a Field Programmable Gate Array (FPGA) that has been designed to implement in its hardware and/or firmware at least a part of an embodiment disclosed herein.

system—A collection of devices and/or instructions, the collection designed to perform one or more specific functions.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

wireless—any means to transmit a signal that does not require the use of a wire or guide connecting a transmitter and a receiver, such as radio waves, electromagnetic signals at any frequency, lasers, microwaves, etc., but excluding purely visual signaling, such as semaphore, smoke signals, sign language, etc.

wireline—any means to transmit a signal comprising the use of a wire or waveguide (e.g., optical fiber) connecting a transmitter and receiver. Wireline communications can comprise, for example, telephone communications over a POTS network.

DETAILED DESCRIPTION

1. Introduction

In a variety of modern applications, data are commonly viewed as infinite time ordered data streams rather as finite data sets stored on disk. This view challenges fundamental assumptions in data management and poses interesting questions for processing and optimization.

Certain exemplary embodiments approach and/or address the problem of identifying correlations between multiple data streams. Certain exemplary embodiments provide algorithms capable of capturing correlations between multiple continuous data streams in a highly efficient and accurate manner. Certain exemplary embodiments provide algorithms and/or techniques that are applicable in the case of both synchronous and asynchronous data streaming environments. Certain exemplary embodiments capture correlations between multiple streams using the well known technique of Singular Value Decomposition (SVD). Correlations between data items, and the SVD technique in particular, have been repeatedly utilized in an off-line (non stream) context in the database community, for a variety of problems, for example, approximate query answering, mining, and indexing.

Certain exemplary embodiments provide a methodology based on a combination of dimensionality reduction and sampling to make the SVD technique suitable for a data stream context. Certain exemplary techniques are approximate, trading accuracy with performance, and this tradeoff can be analytically quantified. Presented herein is an experimental evaluation, using both real and synthetic data sets, from a prototype implementation of certain exemplary embodiments, investigating the impact of various parameters in the accuracy of the overall computation. The results indicate that correlations between multiple data streams can be identified, in some cases very efficiently and accurately. The algorithms proposed herein, are presented as generic tools, with a multitude of applications on data streaming problems.

In many modern applications, data are commonly viewed as an infinite, possibly ordered data sequences rather as a finite data set stored on disk. Such a view, challenges fundamental assumptions related to the analysis and mining of such data, for example, the ability to examine each data element multiple times, through random or sequential access. In many traditional applications, such as networking and multimedia, as well as in new and emerging applications, like sensor networks and pervasive computing, this view of application data is prevalent. Commonly such (potentially) infinite ordered sequences of data, are referred to as data streams.

Networking infrastructure, such as routers, hubs, and traffic aggregation stations, can produce vast amounts of performance and fault related data in a streaming fashion. Such information can be vital for network management operations and sometimes needs to be collected and analyzed online.

Network operators can require precise characterizations of the temporal evolutions of such data and/or identification of abnormal events.

Sensor networks are becoming increasingly commonplace. The vision of pervasive computing can involve hundreds of autonomous devices collecting data (such as highway traffic, temperature, etc.) from dispersed geographic locations. Such data, subsequently can be made available to inter-operating applications which can utilize them to make intelligent decisions.

Data elements in real data sets are rarely independent (see Reference 15). Correlations commonly exist and are primarily due to the nature of the applications that generate the data. In settings involving multiple data streams, correlations between stream elements are encountered as well. Effectively quantifying correlations between multiple streams can be of substantial utility to a variety of applications, including but not limited to:

Network Security Monitoring: Various forms of bandwidth attacks can introduce highly correlated traffic volumes between collections of router interfaces. Efficiently identifying such correlations as they occur can trigger prevention mechanisms for severe problems such as flash crowds and denial of service attacks without address spoofing.

Network Traffic engineering: A large amount of correlation can exist between faults reported by the links of network elements to the central fault management system. Identification of such correlations as they develop can be of utility for fault management automation. Similarly monitoring the stability of network protocols (such as, e.g., BGP (see Reference 28)) can utilize on-line monitoring of correlations between the fault messages produced.

Sensor Data Management: Traditional data processing and analysis on data collected from sensor networks can benefit, in terms of space and/or time, from reduced data representations, derived from correlations (see Reference 4). For example, consider a number of sensors in the same geographical area collecting and reporting temperature. In some circumstances, it might be expected that temperatures in the same region are related, thus the values reported by the sensors for that region are highly correlated. Utilizing these correlations, one can derive reduced data representations and reason about the state of a system under sensor surveillance using less data, with immediate performance benefits.

Multimedia: In multimedia applications, correlations across different cues have become and will likely continue to be of significant benefit. Typically, a visual scene is pictured by a multitude of inexpensive cameras and microphones, and the resulting streams are analyzed to focus cameras and apply sound filters to allow applications such as tele-conferencing over limited bandwidth. In most scenarios the different cues are correlated, and a promising approach to this problem appears to be the recognizing the correlations in real time.

Certain exemplary embodiments provide fast and/or efficient techniques to identify correlations between multiple data streams. Certain exemplary embodiments focus on a fundamental form of correlations between multiple streams, namely linear correlations, and adapt a technique widely utilized for identifying linear correlations. In particular, certain exemplary embodiments adapt the Singular Value Decomposition (SVD) (see Reference 7) in a data stream context. Certain exemplary embodiments make at least the following contributions:

An investigation of the SVD operation on streams and propose algorithms to support the SVD computation on Data Streams. Certain exemplary embodiments are orthogonal to the specific SVD computation technique used.

A construction of a probabilistic map of the stream to a space different than that of the input, computing the SVD in the mapped space. This mapping can be amenable to efficient updating, which can be of benefit in a streaming context. Also, the accuracy tradeoffs this mapping offers in the case of SVD computations is analytically quantified.

An enhancement this mapped space with sampling and the introduction of very fast algorithms for SVD maintenance in the various data stream models proposed.

Complementation of certain exemplary algorithms and analysis with a thorough experimental evaluation, realizing the accuracy and performance benefits certain exemplary embodiments have to offer using both real and synthetic data sets The next portion of this description is organized as follows: In Section 2 we present background material and definitions. Section 3 demonstrates the difficulties of adapting known SVD computation techniques to a streaming context. In Section 4 we present certain exemplary embodiments of our techniques and analysis enabling adaptation of SVD to a continuous stream environment. In section 5 we present the streamSVD algorithm. In section 6 we present the results of our experimental evaluation of certain proposed algorithms. Section 7 concludes this portion of the description, raising issues for further work in this area.

2. Background and Additional Definitions 2.1 Data Stream Models

A data stream S is an ordered sequence of data points that can be read only once. Formally, a data stream is a sequence of data items . . . $x_i$, . . . read in increasing order of the indices i. On seeing a new item $x_i$, two situations of interest arise: either we are interested in all N items seen or we are interested on a sliding window of the last n items, $x_{i-n}$, . . . . . , $x_i$. The former is defined as the standard data stream model and the latter as a sliding window data stream model (see Reference 3). The central aspect of most data stream computation is modeling in small space relevant to the parameter of interest N or n.

For the purposes of this description, data points in a single stream, have the form (i,$\Delta$) representing a sequence of updates or modifications (increment or decrement) of a vector U. In the case of an update U[i]=$\Delta$. Similarly, for modifications U[i]=U[i]+$\Delta$. Notice that an evolving time series can be represented by elements of updates (i,$\Delta$) with the restriction that data arrives in increasing order of i, (indicating time of observation). Thus, for a time series model, $\Delta$ corresponds to the observed value at time i.

Let $S_1$, . . . , $S_{m-1}$, $S_m$ be a collection of m data streams. In certain envisioned applications, m$\leq$n; that is, the number of streams is usually much smaller than the number of items or points of observation in each stream. We use the notation A[i][j] to refer to the j-th point of the i-th stream. Thus, we treat the data streams as a matrix, A. Notice that our treatment of the streams as a matrix A is purely conceptual. Our techniques neither require nor materialize matrix A at any point. At each point in time, data elements (tuples) (i, t, $\Delta$) appear, which denote that in the $t^{th}$ observation of stream i, the entry A[i][t] is either updated to $\Delta$ or modified (incremented or decremented) by $\Delta$. In the sliding window model, at time $\tau$ we are interested in A[i][t'] for all $\tau-n \leq t' \leq \tau$; we refer to all other items as expired.

If there are no restrictions on the tuples (i,t,$\Delta$), then the streams are considered asynchronous. For example, we can observe a sequence . . . , (1,3,3), (2,3,1), (1,1,5), . . . , for two streams which denotes that the streams are modified arbitrarily without any coordination between successive tuples. Assuming a collection of m streams, we will say that these streams are synchronous if at every time t, m values, each corresponding to one of the streams arrive. It is not necessary that the tuples be ordered according to the stream i, but it is required that the tuples be ordered in time. If a tuple (i,t,$\Delta$) is not present at time t for stream i, the tuple (i, t,0) is assumed present, allowing streaming of "sparse" streams.

Given this structure, observe that modifications are superfluous in synchronous streams since all modifications to the element A[i][t] ($t^{th}$ element of $i^{th}$ stream) have to be grouped together. In a sense, $\Delta$ values in the tuple (i,t,$\Delta$) in synchronous streams always expresses updates. Since we wish to present stream algorithms for both asynchronous and synchronous streams, we will proceed with the assumption of arbitrary arrivals of (i,t,$\Delta$) (no restriction on t) assuming that $\Delta$ values express modifications. This, naturally expresses asynchronous as well as (suitably restricted requiring ordered t values and $\Delta$ values expressing updates) synchronous streams.

2.2 Correlations and SVD

The Singular Value Decomposition (SVD) is a very popular technique to identify correlations, with many applications in signal processing, visualization, and databases. Informally the SVD of a collection of points (high dimensional vectors) identifies the "best" subspace to project the point collection in a way that the relative point distances are preserved as well as possible under linear projection. Distances are quantified using the $L_2$ norm. More formally:

Theorem 1 (SVD). Let $A \in R^{m \times n}$ be an arbitrary m-by-n matrix with m≧n. Then we can write $A = U \Sigma V^T$ where U is m-by-r and satisfies $U^T U = I$, V is m-by-r and satisfies $V^T V = I$ and $\Sigma = diag(\sigma_1, \ldots, \sigma_r)$, where $\sigma_1 \geq \ldots \geq \sigma_r \geq 0$. The columns $u_1, \ldots, u_r$ of U are called left eigenvectors. The columns $v_1, \ldots v_r$ of V are called right eigenvectors. The $\sigma_1$ are called eigenvalues and r is the rank of matrix A, that is the number of linearly independent rows (if m≧n, the SVD is defined by considering $A^T$.).

For each eigenvalue there is an associated eigenvector; commonly we refer to the largest eigenvalue as the principal eigenvalue and to the associated eigenvector as the principal eigenvector. Notice that if u is the principal eigenvector, $|A_u| \geq |A_{u'}| \; \forall u', \; u' \neq 1$.

This theorem has an intuitive geometric interpretation. Given any m-by-n matrix A, think of it as a mapping of a vector $x \in R^n$ to a vector $y \in R^m$. Then we can choose one orthogonal coordinate system for $R^n$ (where the unit axes are the columns of V) and another orthogonal coordinate system for $R^m$ (where the unit axes are the columns of U) such that A is diagonal ($\Sigma$), i.e., maps a vector $$x = \sum_{i=1}^{r} \mu_1 v_1$$

to a $$y = Ax = \sum_{i=1}^{r} \sigma_1 \mu_1 u_1.$$

According to theorem 1, $$A = \sum_{i=1}^{r} \sigma_i u_i v_i^T.$$

Matrix A has small rank when data are correlated (r≦m). Consequently, using k≦r eigenvectors (projecting to a subspace of dimension k) we have $$A \approx \sum_{i=1}^{k} \sigma_i u_i v_i^T.$$

Such a projection introduces error which is quantified by $$\left| A - \sum_{i=1}^{k} \sigma u_i v_i^T \right|.$$

The guarantee of SVD however, is that among all possible k dimensional projections, the one derived by SVD has the minimum error, i.e., minimizes $$\left| A - \sum_{i=1}^{k} \sigma u_i v_i^T \right|.$$

The basis of the "best" k-dimensional subspace to project, consists of the k left eigenvectors of U. Essentially, this subspace identifies the strongest linear correlations in the underlying data set.

Definition 1 (Linear Correlations). Given a matrix A, let $U\Sigma V$ be its Singular Value Decomposition; we refer to the set of linear combinations of the k eigenvectors, corresponding to the k largest eigenvalues of A as the k strongest linear correlations in A.

The relative magnitude of the eigenvalues determine the relative "strength" of correlations along the direction of the associated eigenvectors. This means that if one eigenvalue, $\sigma$ is very large compared to the others, the eigenvector corresponding to $\sigma$ signifies a stronger linear correlation towards the direction of the eigenvector in the subspace spanned by the k strongest linear correlations. We formalize this intuition by quantifying the relative magnitude of the eigenvalues with the following definition:

Definition 2 ($\epsilon$-separated eigenvalues) Let A be a matrix of rank r and $\sigma_1, \ldots \sigma_r$ its eigenvalues. Assume, without loss of generality, that $|\sigma_1| \geq \ldots \geq |\sigma_r|$. The $\epsilon$-separating value for the collection of eigenvalues, is the smallest $\epsilon \leq 0$, such that $\notexists i$, $1 \leq i \leq r$, $|\sigma_i| \leq (1+\epsilon)|\sigma_{i+1}|$. For this $\epsilon$, we say that the eigenvalues are $\epsilon$-separated.

Notice that such an $\epsilon$ always exists; its magnitude however, specifies how significant are the eigenvectors in the linear combination. If $\epsilon$ is small, eigenvalues are close in magnitude and all the eigenvectors are significant. If $\epsilon$ is large, the linear correlations along the directions of the eigenvectors associated with the largest eigenvalues are more significant in the linear combination.

FIG. 1 visually reveals linear correlation between the points along the axis y'. SVD on the point set of FIG. 1 will result in identification of vector y' as the first eigenvector (axis y'' in FIG. 1 is the second eigenvector). Such correlations could be a great asset in a variety of applications, for example, query processing. Consider projecting onto axis y'; this results in low error and thus reasoning about and querying the point set can take place on such projections. For example, the two dimensional range-count query (1,1)×(3,3), provided that we project the point set into axis y', can be answered by performing the one dimensional range query on axis y' based on the projections of (1,1) and (3,3) onto y'. Notice that to enable such a strategy the left eigenvectors are essential. The advantage is that we are operating in the lower dimensional space obtained after projection. Our approach consists of identifying such correlations existing between stream values dynamically.

Given a matrix A m-by-n there exists a O($m^2n$) algorithm to compute the SVD of A using the following celebrated theorem (see Reference 7 for full details and a proof)

Theorem 2. Let $A=U\Sigma V^T$ be the SVD of the m-by-n matrix A, with eigenvalues $\sigma_i$ and orthonormal eigenvectors $u_i$, where $m \geq n$. (There are analogous results for $m \leq n$.) The eigenvalues of the symmetric matrix $AA^T$ are $\sigma_i^2$. The left eigenvectors $u_i$ are corresponding orthonormal eigenvectors of the eigenvalues $\sigma_i^2$.

The benefit of the above theorem appears in computation of SVD of sparse matrices. If the number of entries in a column is $r \ll m$ then the matrix $AA^T$ can be computed in time $O(r^2n)$ which is $O(r)$ times the number of nonzero entries in the matrix. The pseudo code is provided below. The algorithm remains a good candidate for computing incremental SVD since the number of operations performed on an update is (on an average) the number of non-zero entries in a column.

What follows is psuedo-code for an algorithm we call NaiveSVD. Note that Function SVD() can implement any SVD technique:

Algorithm NaiveSVD(A,M,U,Σ,V,T){
$A \in R^{m \times n}$, $M = AA^T \in R^{m \times m}$,
U,V the set of left, right eigenvectors
Σ the eigenvalues, $T=(i,t,\Delta)$ is current input
  for all nonzero entries in column t, i.e. $\{j | A[j][t] \neq 0\}$ do {
    $M[i][j] += \Delta A[j][t]$ if $j \neq i$
    $M[i][j] += 2\Delta A[j][t] + \Delta^2$ if $j=i$
    $A[j][t] += \Delta$
    observe that the above for synchronous streams
    becomes $A[j][t]=\Delta$ and $M[i][i]=\Delta^2$
    under the assumption that $A[j][t]$ is initially
    0 and changed only once.
  }
SVD(M,U,Σ,V)}

2.3 Low Rank Approximations

The quadratic space requirement of $O(m^2)$ can be prohibitive and the approach is expensive even if we are interested in just the top eigenvector. The computation for non sparse matrices requires $O(m^2n)$ no matter if we are interested in just the topmost eigenvector. A step in this direction is the following column sampling result of (see References 9, 8).

Theorem 3. Given a matrix A with columns C, if with probability $|C_i\|_F^2/|A|_F^2$ we sample $O(k/\epsilon^2)$ columns then we can construct a matrix D of rank k such that for any matrix D*

$$|A-D\|_F^2 \leq |A-D^*\|_F^2 + \epsilon \|A\|_F^2$$

Note that the subscript on the probability indicates that the norm is Frobenius. $|A\|_F^2$ is the sum of squares of the elements in the matrix A. Note that if nice bounds on the ratios are known then sampling can be performed in one pass else in two.

The exact parameters of the process are somewhat large theoretically; (see Reference 9) requires constants $\sim 10^7$ which are improved but not explicitly stated in Reference 8. Note that Reference 8 suggests alternate "test and sample" schemes for practical considerations, thus making the algorithm multi-pass. A problem of the above result is that the approximation of the matrix need not be a good approximation of the eigenvalue which denotes the strength of the correlations. For example suppose we are interested in the topmost eigenvalue $\sigma_1$. Following the results of (see Reference 8) one can relate $\min_{D^*} |A-D^*\|_F^2 = \sigma_1^2$. Thus, $|A-D\|_F^2$ gives us an estimate of $\sigma_1$. If $|A\|_F$ is large, as is the case in non-sparse matrices, the above is a bad approximation since $k|A\|_F^2$ can be m times $\sigma_1^2$. Thus, $\epsilon$ cannot be a constant to provide a good guarantee for the topmost eigenvalue. The result is useful in the context of approximating the entries of a matrix and as pointed out by the authors in (see Reference 8), the approach is used if the matrix is sparse.

3. Problems with SVD on Streams

We will now discuss potential problems associated with SVD computation on streams. The fundamental potential problem with most approaches to SVD is the reliance on the matrix A for the computation. We will elaborate on the issues arising from this reliance in the cases of synchronous and asynchronous streams.

3.1 Synchronous Streams

In this case, m values arrive at each time step each specifying a new value for each of the m streams and the same time unit t. Maintaining the SVD decomposition of A will either involve recomputation of the SVD on matrix A (suitably adjusted depending on the specific streaming model, standard or sliding window) at every time step. This has two main potential drawbacks namely (a) the memory requirements can be significant as matrix A has to be memory resident and (b) the computational overhead associated with maintenance of the SVD decomposition at every time step can be high.

3.2 Asynchronous Streams

In this case we discuss three problems, which are interrelated but arise out of different concerns. The discussion will establish that in the case of asynchronous streams, the memory and computational overheads for maintaining the SVD persist, albeit for different reasons.

3.2.0.1 Out of Sync arrival

Figure 2:
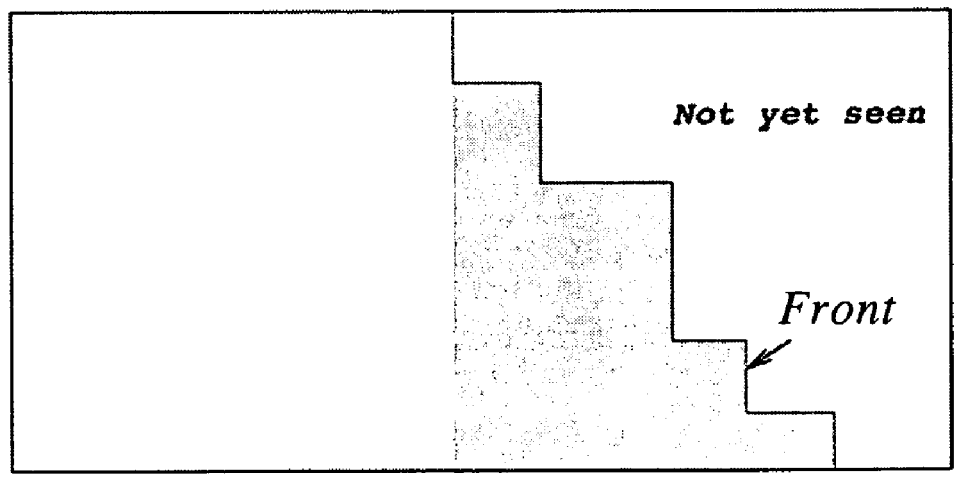
FIG. 2 is a plot of an exemplary set of asynchronous streams demonstrating out-of-sync behavior.

FIG. 2 is a plot of an exemplary set of asynchronous streams demonstrating out-of-sync behavior. Thus, the problem is depicted in FIG. 2, where data in different streams arrive at different rates and create a "Front". Such a phenomenon is common in networking applications due to network delays. Known off line SVD computations will have to store the data corresponding to the entire shaded area. This is a typical "bursty" behavior and the length of the burst will determine the space required by the known algorithms.

3.2.0.2 Stream of Sparse Transactions

If the data sources produce stream values infrequently then only non-zero entries are streamed. This is a favorable condition for the SVD computation. But even if every individual stream is in order, there is no way to foretell that the entry (i,t) is zero till an entry (i,t') arrives with $t' \geq t$. If for stream i one defines $t_i$ to be last time an observation is seen, known algorithms will have to remember all the entries after time min $t_i$ which is akin to FIG. 2, but due to sparsity, the rectangle can be sizeable. This is a more frustrating scenario, since if a sparse matrix is represented in a (row,colum,value) format, although significantly better from a computational point of view for known algorithms, it creates a significant problem in streaming. In fact a possible solution can be to intersperse the implied zero entries, but that would increase processing time significantly.

3.2.0.3 Out of Order Arrival

Figure 3:
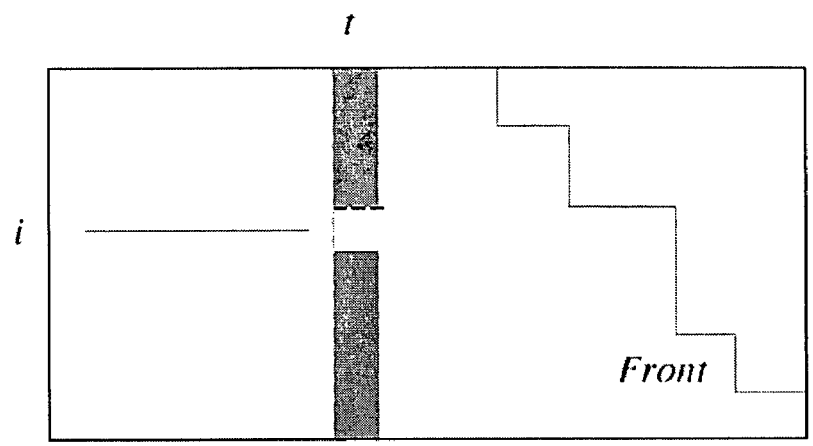
FIG. 3 is a plot of an exemplary set of asynchronous streams demonstrating out-of-order behavior.

FIG. 3 is a plot of an exemplary set of asynchronous streams demonstrating out-of-order behavior. Consider FIG. 3 and suppose the entry corresponding to stream i and observation t is modified. Out of order arrival can be assumed as modification of an initial 0 value—the effect of the change depends on the values of all other streams at the observation t (denoted by the shaded region in FIG. 3). But since t is not known a priori, effectively one has to store the entire matrix A.

4. Stream SVD

We will present an approximate technique to obtain the k largest eigenvalues and associated eigenvectors trading accuracy for computation speed. We will first present the case for the principal eigenvalue and the associated principal eigenvector, and then generalize to arbitrary k eigenvalues and eigenvectors.

Given a matrix $A \in R^{m \times n}$ the set of all k correlations is defined as the set of linear combinations of the left eigenvectors corresponding to the k largest eigenvalues. Recall that u is a left eigenvector with eigenvalue $\sigma$ if and only if $u^T A = \sigma u^T$. Theorem 1 asserts that we can find a set of orthonormal eigenvectors of any matrix A. The number of such vectors is the rank r of the matrix concerned. Before we proceed in the discussion let us assume that the eigenvectors of A are $\bar{u}_1$, $\bar{u}_2, \ldots \bar{u}_r$ with respective eigenvalues $\sigma_1, \sigma_2, \ldots \sigma_r$. Let us assume, without loss of generality that $|\sigma_1| \geq |\sigma_2| \geq \ldots \geq |\sigma_r|$.

Our methodology will make use of the Johnson-Lindenstrauss Lemma (JL Lemma) (see Reference 20) to reduce the dimension in a Euclidean space.

Lemma 1 (JL Lemma). Given a set of N vectors V in space $R^n$, if we have a matrix $S \in R^{s \times n}$ where $$s = O\left(\frac{1}{\varepsilon^2} \log N\right)$$

such that each element $S_{ij}$ is drawn from a Gaussian distribution, appropriately scaled, for any vector $x \in V$, then $\|x\|_2 \leq \|Sx\|_2 \leq (1+\varepsilon)\|x\|_2$ holds true with vanishingly high probability, $1-o(1/N)$.

We discuss issues in computation and storage of maintaining $AS^T$ in Section 4.1. For the present we investigate how matrix $AS^T$ allows us to compute SVD.

Informally, the JL lemma states that if we distort vectors of dimensionality n with a matrix whose elements are suitably chosen from a Gaussian distribution we can preserve the relative distances between the vectors in the resulting space (of dimensionality s) upto $(1+\varepsilon)$ with arbitrarily high probability. Intuitively, suppose every vector is represented by a line segment starting from the origin. The length of the vector is the distance between the origin and the endpoint of the vector. The intuition behind the algorithm is that if we preserve distances between points (the origin and the endpoints of the vectors), then we preserve the length of the vectors.

4.0.0.4 The Single Eigenvalue case

We make the simple observation that $\|x\|_2 = \|x^T\|_2$. So the JL lemma rewrites to, $\|x^T\|_2 \leq \|(Sx)^T\|_2 = \|x^T S^T\|_2 \leq (1+\varepsilon)\|x^T\|_2$ (1)

Both lemma 1 and theorem 2 are concerned with linear operations on the underlying vector space. It appears natural to first apply lemma 1 on A to reduce the dimensionality and then apply SVD on the "smaller" matrix obtained. This could be beneficial, because we will be running SVD on a much smaller matrix. Under such an approach, the relationship between the eigenvalues and eigenvectors of A before and after the application of lemma 1 needs to be established. This gives rise to the following:

Lemma 2. Suppose $\bar{u}_1$ is the principal left eigenvector of A and u the principal left eigenvector of $AS^T$ for a matrix S satisfying the JL Lemma with $$s = O\left(\frac{1}{\varepsilon^2} \log n\right).$$

Then $\|\bar{u}_1^T A\|_2 \leq (1+\varepsilon)\|u^T A\|_2$

Proof: Since u is the principal left eigenvector of $AS^T$, we have $\|\bar{u}_1^T AS^T\|_2 \leq \|u^T AS^T\|_2$. Substituting $x^T = \bar{u}_1^T A$ in equation 1, we get $\|\bar{u}_1^T A\|_2 \leq \|\bar{u}_1^T AS^T\|_2 \leq (1+\varepsilon)\|\bar{u}_1^T A\|_2$ and similarly $x^T = u^T A$. From these we have $\|\bar{u}_1^T A\|_2 \leq \|\bar{u}_1^T AS^T\|_2 \leq \|u^T AS^T\|_2 \leq (1+\varepsilon)\|u^T A\|_2$. This proves the lemma □.

Let $\sigma_1'$ the principal eigenvalue of $AS^T$. From lemma 2 it is evident that $|\sigma_1| \leq |\sigma_1'| \leq (1+\varepsilon)|\sigma_1|$. Thus, the first eigenvalue is approximated within $(1+\varepsilon)$ factor in magnitude by application of lemma 1.

4.0.0.5 The Single Eigenvector case

Lemma 2 shows that instead of computing the SVD of the matrix $AA^T$ applying theorem 2, we can compute the SVD of $AS^T$ to get a vector such that the columns of A have a large projection along it. The dimension of the matrix $AA^T$ is m×m whereas the dimension of $AS^T$ is $$m \times \frac{1}{\varepsilon^2} \log n.$$

For large m compared to $$s = \frac{1}{\varepsilon^2} \log n,$$

one has achieved a significant saving in computing the SVD. In particular the time to perform SVD has been reduced from $O(m^3)$ to $O(ms^2)$. Also we have saved the space and update time in the data stream context, from $O(m^2)$ to $O(ms)$.

Lemma 2 shows that the projections of a matrix are preserved under the application of lemma 1. We now show what is the quality of the approximation obtained to the actual principal eigenvector. A measure of quality of approximation of the principal eigenvector, is the inner product with the actual principal eigenvector. Assuming all vectors are represented with unit length, a large value of the projection indicates a better approximation. Notice that such an approximation is meaningful only if the principal eigenvector is unique. Consider the case of a matrix A with $|\sigma_1| \approx |\sigma_2|$. Then any linear combination of $\bar{u}_1$ and $\bar{u}_2$, say $u = a\bar{u}_1 + b\bar{u}_2$ (where $a^2 + b^2 = 1$ to preserve length of $\|u\|_2 = 1$) is a principal eigenvector, since there are a lot of vectors preserving the variation in the data, in this case. To see this, observe that in this case $$\|u^T A\|_2^2 = u^T A A^T u = a^2 \sigma_1^2 + b^2 \sigma_2^2 \leq \min(\sigma_1^2, \sigma_2^2)$$

This is best illustrated if the data are uniformly distributed along a circle; any vector in the plane containing the circle is a good eigenvector. To clarify the situation, we assume that there is a significant linear trend in the data. This means that the eigenvalues are separated in magnitude. In case of the principal eigenvector this would imply $|\sigma_1| >> |\sigma_2|$; we will address multiple eigenvectors in the subsequent subsections. In particular assume $|\sigma_1| = (1+\delta\varepsilon)|\sigma_2|$ for some $\delta > 4$.

For two vectors u, v, let $\langle u, v \rangle$ denote their inner product. If $\sigma_1, \sigma_2$ are the first and second eigenvalues and $\bar{u}_1, \bar{u}_2$ the associated eigenvectors, then $$(1+\varepsilon)^{-2} \sigma_1^2 \leq \|u_1^T A\|_2^2 = \sum_i \langle u_1, \bar{u}_i \rangle^2 \sigma_i^2 \leq \langle u_1, \bar{u}_1 \rangle^2 \sigma_1^2 + (1 - \langle u_1, \bar{u}_1 \rangle^2) \sigma_2^2$$

since the coefficients $\langle u_1, \bar{u}_i \rangle$ represent the projection of $u_1$ to an orthogonal basis defined by $\{\bar{u}_i\}$, the sum of their squares evaluate to 1. Thus $$\Sigma_{i \neq 1} \langle u_1, \bar{u}_i \rangle^2 = 1 - \langle u_1, \bar{u}_1 \rangle^2.$$

The above rewrites to $$\langle u_1, \bar{u}_1 \rangle^2 \geq \frac{1}{(1+\varepsilon^2)} \frac{\sigma_1^2 - (1+\varepsilon)^2 \sigma_2^2}{\sigma_1^2 - \sigma_2^2} \geq \frac{1}{(1+\varepsilon)^2} - \frac{1}{\delta} \quad (2)$$

For a specific value of $\varepsilon$, equation 2 shows the quality of the approximation to $\bar{u}_1$ obtained. Notice that if $\delta >> \varepsilon$ (that is, the strength of linearity is greater than the precision lemma 1 guarantees) then $\langle u_1, \bar{u}_1 \rangle^2 \approx (1+\varepsilon)^{-2}$ which approaches 1. Thus, if the first two eigenvalues are $\delta\epsilon$-separated, $u_1$ the approximated eigenvector and $\bar{u}_1$ the true eigenvector are very close. Effectively this establishes that if there is a significant linear trend in the data, performing SVD on matrix $AS^T$ as opposed to matrix $AA^T$ results in the same principal eigenvector. Smaller values of $\epsilon$ increase the time to compute the SVD of matrix $AS^T$, but yield a better approximation to the principal eigenvector and vice versa.

Lemma 3. If the data have a unique strong linear correlation, we can approximate the principal eigenvector.

It is evident, that to guarantee a good approximation of the eigenvectors we have to compute at a greater precision than we need to identify the eigenvalues. That is $\epsilon$, the precision set by lemma 1 has to significantly smaller than the separating value of the eigenvalues.

4.0.0.6 The Multiple Eigenvalues case

We consider the case of obtaining an approximation to multiple eigenvalues and eigenvectors of the original matrix A. We will extend the above process to multiple eigenvalues and eigenvectors. In such a case what one can guarantee is that with a similar application of lemma 1, the entire subspace spanned by the largest k eigenvectors can be approximated. Let U be the subspace spanned by k approximated eigenvectors. Assume that we desire to obtain a space U such that the finest granularity on a basis axis is $$\frac{1}{G}, G \in N^*.$$

We claim the following,

Lemma 4. Given a matrix $A \in R^{m \times n}$, and a matrix $S \in R^{s \times n}$ in accordance to lemma 1 such that $$s = O\left(\frac{k}{\varepsilon^2} \log G\right),$$

and any fixed subspace U spanned by at most k (not necessarily known) vectors, such that the finest granularity on an axis is $$\frac{1}{G},$$

if $u \in U$ then with high probability (vanishingly close to 1)

$$\|u^T A\|_2 \leq \|u^T A S^T\|_2 \leq (1+\epsilon)\|u^T A\|_2$$

The above lemma is a generalization of lemma 1, with the observation that if we are trying to preserve the distance between objects specified by a linear combination with precision G, then we have at most $G^k$ objects. Applying $n = G^k$ in the statement of lemma 1 gives the result. Intuitively lemma 4 states that a larger matrix S (smaller distortion to matrix A) is required in order to obtain an approximation to the largest k eigenvectors.

Assume that via the application of lemma 2 we find a vector $u_1$ with $\|u_1\|_2=1$ and maximum $\|u_1^T AS^T\|_2$. According to lemma 2 $(1+\epsilon)^{-1}|\sigma_1| \leq \|u_1^T A\|_2 \leq |\sigma_1|$. Now consider the subspace of all vectors u such that $\langle u, u_1 \rangle = 0$ (the subspace of all vectors orthogonal to $u_i$). Consider the second largest eigenvector of $AS^T$, denoted by $\bar{u}_2$. Denote $y_2$ to be normalized component of $\bar{u}_2$ which is orthogonal to $u_1$. Notice $y_2$ can be a candidate for the second largest eigenvector for $AS^T$.

Lemma 5. If $|\sigma_1| > (1+\epsilon)|\sigma_2|$ then $\|y_2^T A\|_2 \geq |\sigma_2|$, and therefore we get a vector $u_2$ such that $\|u_2^T A\|_2 \geq (1+\epsilon)^{-1}|\sigma_2|$.

This lemma establishes that if $|\sigma_1| > (1+\epsilon)|\sigma_2|$ (i.e., $\sigma_1$ and $\sigma_2$ are $\epsilon$-separated) an excellent approximation to the second largest eigenvalue of A exists. Generalizing for k eigenvalues, we have:

Lemma 6. If for each i, $1 \leq i \leq k$ we have $|\sigma_i| > (1+\epsilon)|\sigma_{i+1}|$ we can find a $u_{i+1}$ such that $\|u_{i+1}^T A\|_2 \geq (1+\epsilon)^{-1}|\sigma_{i+1}|$ 4.0.0.7 The Multiple Eigenvector case The reasoning about the quality of $u_i$ as an approximation carries over in this case. We would need the eigenvalues to be more than $\epsilon$-separated (say $\delta\epsilon$-separated) to obtain a good approximation. Following similar reasoning as in the case of $u_1$ one can show that $u_2$ gets arbitrarily close to $\bar{u}_2$, depending on the separation between $\sigma_2$ and $\sigma_3$. For a specific value of $\epsilon$, and $\delta$ the quality of approximation to $\bar{u}_2$ is obtained from an equation similar to equation 2. As in the single eigenvector case, to achieve approximation of the eigenvectors we have to compute at a greater precision than we need to identify the eigenvalues.

Thus, the subspace obtained via this approximation can be arbitrarily close to the subspace obtained by the true k largest eigenvectors, given that the eigenvalues are at least $\epsilon$-separated. For a specific value of $\epsilon$ the quality of the approximation obtained to each $\bar{u}_i$ is dictated by equations similar to equation 2. Larger values of $\epsilon$ decrease the SVD computation time but decrease the quality to the subspace approximation one obtains. This gives rise to a tradeoff that we will experimentally quantify in section 6.

4.1 Discussion

The analysis of the previous section established that it is possible to compute eigenvalues and eigenvectors of a matrix A (of size m×n) up to desired accuracy, by computing the SVD decomposition (using any applicable technique) of a much smaller matrix $AS^T$ (of size m×s). This could have significant performance benefits, independently of the specific technique used to compute the SVD, since the procedure would operate on a much smaller matrix.

Matrix S is populated initially from a suitably scaled Gaussian distribution in accordance to lemma 1. The full matrix S is not realized, instead it is stored as a collection of s hash functions h[j] such that S[j][t]=h[j](t). This is one of the central techniques in streaming computation and Reference 1 phrases the inner product $M[i][j] = \Sigma_t A[i][t]S[j][t]$ as sketches of the data.

Thus, as new stream elements arrive, matrix $AS^T$ can be updated in a very efficient fashion. Let us first assume that we are in the standard stream model. For synchronous streams a single tuple (i,t,$\Delta$) arrives for element A[i][t] and the correct value A[i][t]S[j][t] gets added to M[i][j]. For the asynchronous case the value A[i][t] accepts (possibly multiple) modifications. But the contribution to M[i][j] over all the modifications is again A[i][t]S[j][t] which is the correct value. The entire procedure is presented below as the MapSVD algorithm for the standard stream model. Notice that updates/modifications are provided in an incremental fashion to matrix $AS^T$, and that matrix A is not explicitly materialized.

The problem with the computation of the MapSVD algorithm is that although the SVD computation performed is expected to be faster (because it operates on a smaller matrix), one still has to perform the computation each time matrix $AS^T$ changes. This is required to assure that the eigenvector and eigenvalues maintained stay within desired accuracy levels.

Algorithm MapSVD((i,t,Δ),M,U,Σ,V,P) {
  $M = AS^T \in R^{m \times s}$, $U \in R^{m \times s}$, $\Sigma \in R^{s \times s}$
  $V \in R^{s \times s}$, $P \in R^m$
  $S \in R^{s \times n}$ in accordance to lemma 1, it is a product of
  suitable hash functions, only the functions are stored
  T=(i,t,Δ) is current input (representing A[i][t])
    for (j=0; j<s; j++) {
      M[i][j]=M[i][j]+ΔS[j][t]
      /* For synchronous streams M[i][j]+=A[i][t]S[j][t], resulting in computation of $AS^T$. For asynchronous streams the same result is arrived at since A[j][t] is the sum of the modification */}
    }
  SVD(M,U,Σ,V)/* favorite SVD algorithm */
}

4.2 Recomputations and Sampling

We will develop a sampling strategy that will select stream tuples and periodically apply SVD while, at the same time, is able to preserve the quality of the underlying eigenvectors and eigenvalues obtained.

Suppose the stream has not changed significantly from a certain time when we computed the SVD for it. Then, the matrix corresponding to the stream has also not changed significantly. Suppose we recomputed the SVD last when the matrix corresponding to the stream was $A_1$. Suppose the stream currently corresponds to matrix A. These matrixes are used conceptually only; in practice we never store them. Suppose the two matrices agree almost everywhere, and thus their eigenvectors/values agree as well. This is captured by the following lemma:

Lemma 7. If $\|y^T A_1 S^T\|_2 = \sigma$ and $\|y\|_2 = 1$ then $\|y^T A\|_2 \geq \sigma/(1+\epsilon) - \|A_1 - A\|_F$. $\|A_1 - A\|_F^2$ is the square of the Frobenius norm of $A_1 - A$ and is equal to the sum of squares of all elements.

Proof: From the previous section we are guaranteed that if $\|y^T A_1 S^T\|_2 = \sigma$ then by Lemma (see Reference 20) $(1+\epsilon)\|y^T A\|_2 \geq \|y^T A_1 S^T\|_2 = \sigma$. From Linear Algebra, $\|y^T A_1\|_2 - \|y^T A\|_2 \leq \|y^T(A_1 - A)\|_2 \leq \|y^T\|_2 \|A_1 - A\|_F$. Since $\|y^T\|_2 = \|y\|_2 = 1$, the proof follows. □

This means that if y was an eigenvector with a large projection in $A_1$ and $\|A_1 - A\|_F$ is small compared to σ, then y still has a large projection. In other words it is an approximate eigenvector. We first show that Lemma 8. Suppose we computed SVD for the stream which corresponds to the matrix $A_1$ at time $t_1$ and did not recompute SVD since. Suppose after that we saw tuples (i,t,Δ) and currently the matrix corresponding to the stream is A. Suppose further that no tuple expired (which is always true in standard streaming model), if $$\sum_{(i,t,\Delta) seen\ since\ t_1} |\Delta| = D$$

then $\|A_1 - A\|_F \leq D$.

Proof: Let us focus on one element $A_1[i][t]$ which is modified by several $\Delta_1, \ldots, \Delta_u$. Based on the specific model standard or sliding window, synchronous or asynchronous the number u will vary. But we will give the most general proof which holds for all cases. Thus $A[i][t] = A_1[i][t] + \Delta_1 + \ldots + \Delta_u$.

$$|A_1[i][t] - A[i][t]| = |\Delta_1 + \ldots + \Delta_u| \leq \sum_{v=1}^{u} |\Delta_v|$$

Adding this over i, t, the right hand side is the D, the sum of all magnitudes of changes seen. Now $$|A_1 - A|_F^2 = \sum_{i,t} |A_1[i][t] - A[i][t]|^2 \leq \left(\sum_{i,t} |A_1[i][t] - A[i][t]|\right)^2 \leq D^2$$

Therefore $\|A_1 - A\|_F \leq D$. □

If we do not recompute the SVD and $\|A_1 - A\|_F$ is small compared to σ the eigenvectors of $A_1$ are still reasonable for our current stream matrix A. Suppose we are interested in preserving the principal eigenvector (for other eigenvectors the discussion is similar). Since we are interested in 1±ε approximation, we will have to ensure that $D \sim \epsilon \sigma_1$. An excellent way to achieve this is by randomly recomputing the SVD depending on the magnitude |Δ| seen. If |Δ| is large compared to $\epsilon \sigma_1$ we should choose to recompute, otherwise we would not. Thus the recomputation should be done with probability $|\Delta|/(\epsilon \sigma_1)$.

The ε factor in the probability ensures that after we have seen enough new information which satisfies $\Sigma|\Delta| \geq \epsilon \sigma_1$ we would have very likely $$\left(\text{probability } 1 - \frac{1}{e} \sim 0.63\right)$$

(probability have recomputed the SVD. If we did not, then by the time $\Sigma|\Delta| \geq 2\epsilon \sigma_1$, we would have recomputed the SVD with probability $$1 - \left(\frac{1}{e}\right)^2 \sim 0.86.$$

The probability of not having computed the SVD for long, decreases exponentially. The Expected value is $1.4\ \epsilon \sigma_1$. Thus from Lemma 7 and Lemma 8 the principal eigenvector of $A_1 S^T$ would have a projection on A which is at least $1 - O(\epsilon)$ with some high probability.

5. The StreamSVD Algorithm

The sampling procedure introduced leads to an effective way to save on the number of times the SVD is computed. Instead of computing the SVD of matrix $AS^T$ every time an item arrives, in accordance to lemma 7, we can compute it less often and still get a good approximation to eigenvectors and eigenvalues of matrix A.

Combining the results of Section 4 we can now realize efficient algorithms for maintaining the SVD decomposition on the various stream models, namely the standard and the sliding window stream model. The algorithm is provided below for the case of the sliding window model as the StreamSVD algorithm. The algorithm for the standard model is the same, there is no expiry and that condition is never used.

Figure 4:
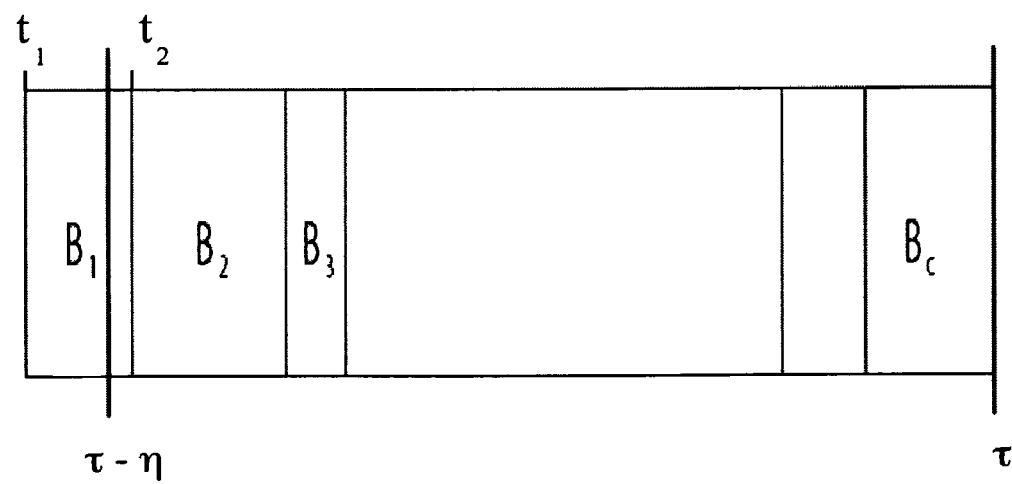
FIG. 4 is a plot of the structure of an exemplary set of blocks created by StreamSVD.

The StreamSVD algorithm starts from MapSVD and probabilistically recomputes the SVD depending on the magnitude |Δ| of the value seen compared to the eigenvalue $\sigma_1$ (assuming that we are interested in the topmost eigenvalue; if interested in all the k-th largest eigenvalues, we substitute $\sigma_1$ with $\sigma_k$). For the case of the synchronous model, the sampling procedure breaks the stream into several sub-matrices, $B_1 \ldots B_c$ depending on when we sample. This is shown in FIG. 4, which plots the structure of blocks created by StreamSVD for the case of the synchronous sliding window stream model.

The sub-matrix $B_1$ starts at time $t_1$ when we sampled in the probabilistic step in StreamSVD and ended when we sampled the next time (at $t_2$). We store the products of the sub matrices $B_uS^T$ in the blocks $M^u$ in the algorithm StreamSVD. For the standard streaming model it is easy to see that $\Sigma_u M^u$ is the entire inner product, namely matrix M. For sliding window streams if $t_1 < \tau - n \leq t_2$ then the block $B_1$ is partially relevant—some of its entries have expired. Now the sum of the $|\Delta|$ for the entries in each sub matrix $B^u$ is $\theta(\epsilon\sigma_1)$ as follows from the discussion in the previous section, since we did not recompute the SVD in the middle. If we computed the SVD last when the matrix was $A_1$ using a certain number of blocks and none of the blocks expired (otherwise we would recompute SVD)—the two matrices $A_1$ and A agree everywhere except in the current block. Now the $\Sigma|\Delta|$ of each block is $1.4 \epsilon\sigma_1$. By Lemma 8 we have a $(1\pm1.4\ \epsilon)$ approximation. Therefore the eigenvalue if preserved.

Lemma 9. The maximum number of blocks created in case of synchronous sliding window streams is at most $O(m/\epsilon)$.

The above follows from the fact that we have an estimate of the Frobenius norm of the blocks related to $\sigma_1$ and likewise the Frobenius norm A is related to $\sigma_1$. The proof is completed by relating the norms of the blocks to norms of A.

The case of asynchronous streams is more involved. Since the data do not arrive in order, the pieces of matrix whose inner product is in the different blocks overlap. The eigenvalue is still preserved up to $1\pm1.4\ \epsilon$. A lemma analogous to lemma 9 can be proved under certain restrictions. We omit details due to lack of space.

The StreamSVD algorithm for the sliding window model is as follows. A similar algorithm can be designed for the case of the standard stream model.

Algorithm StreamSVD$((i,t,\Delta),M,U,\Sigma,V,P)$ {
$M=AS^T \in R^{m \times s}$, $U \in R^{m \times s}$, $\Sigma \in R^{s \times s}$
$V \in R^{s \times s}$, $P \in R^m$, $S\Sigma R^{s \times n}$ as in lemma 1
$\sigma_1$ largest eigenvalue of M computed in a previous invocation of StreamSVD, Current time is $\tau$
The inner product $\Sigma_t A[i][t]S[j][t]$ is maintained through at most c blocks where $\Sigma_u M_u[i][j] = \Sigma_t A[i][t]S[j][t]$
Block $M^c$ is Current, On arrival of $(i,t,\Delta)$, with $t \geq \tau - n$ {
If ((stamp of $M^r$ is $\tau - n$) or (with probability $$O\left(\frac{|\Delta|}{\epsilon|\sigma_1|}\right)$$

Block $M^c$ is closed with stamp $\tau$
If (stamp of $M^1$ it $\tau - n$ {/* $M^1$ expires */ for
   for (u=1; u<c; u++)
   $M^u \leftarrow M^{u+1}$
   $c \leftarrow c - 1$
   }
Start a new block $M^{c+1}$ and set it Current
Recompute the SVD(M,U,$\Sigma$,V).
/* use favorite algorithm */
}
for (j=0; j<s; j++)
Current Block[i][j] += $\Delta$S[j][t]
}

Independently, this sampling step could be applied to algorithm NaiveSVD surpassing the dimensionality reduction step. This would provide an $(1-\epsilon)$ approximation to the eigenvalues, for some $\epsilon \geq 0$. Following reasoning related to that in Section 4 the eigenvectors are preserved well also. Indeed we explore this option for algorithm NaiveSVD in section 6.

6. Experimental Evaluation

In this section we present a performance analysis of the algorithms and techniques discussed thus far. We seek to quantify the benefits both in terms of accuracy and performance of the proposed techniques. We present the data sets we experimented on, as well as the metrics used to quantify accuracy.

Description of Data Sets: Correlation affects the sampling component of our algorithms and thus is vital for the performance of our schemes. In addition to real data sets, we used synthetic data sets, in which we had the freedom to vary the degree of the underlying correlations and gain additional intuition about the performance of our proposal. We describe the data sets below:

Gaussian: The values of each data stream are chosen independently from a Gaussian distribution N(50,50) (mean 50 and variance 50). We expect no correlations between the streams.

Linear: The values between the streams are linearly correlated.

Linear-S: Starting from data set Linear we distort each data stream value by adding noise. In particular we add a sample from N(2,2).

Linear-M: Similar to data set Linear-S but we add samples from N(10,10).

Linear-L: Similar to data set Linear-S but we add samples from N(30,30).

Real: Real data representing the number of packets through various interfaces of several network cards of an operational router.

Measurement Metrics:

Several parameters affect the accuracy and performance of our approach and should be quantified. We evaluate the accuracy of the SVD computed with algorithm StreamSVD by reporting on the accuracy of the eigenvalues and eigenvectors computed. We quantify the accuracy of eigenvalues using the Average Absolute Relative Error (AARE) defined as follows:

Definition 3. Let V be an eigenvalue computed with algorithm NaiveStreamSVD and V' the corresponding eigenvalue computed using algorithm StreamSVD. The Absolute Relative Error (ARE) between the two eigenvalues is defined as $$ARE = \frac{|V - V'|}{V}$$

In the experiments that follow we report the Average Absolute Relative Error (AARE) as the average over a large number of stream tuples (100K) of the ARE. We also report the standard deviation of ARE over the same number of stream tuples.

Let u be an eigenvector computed using algorithm NaiveSVD and u' the corresponding eigenvector computed using StreamSVD. If the vectors were identical, then $\langle u,u'\rangle = 1$. To quantify the accuracy of eigenvectors computed using algorithm StreamSVD, we report the average value of $\langle u,u'\rangle$ as well as the standard deviation of $\langle u,u'\rangle$ over a large number (100K) stream tuples.

6.1 Evaluating StreamSVD

The first set of experiments we present, evaluate the accuracy of the approximation on eigenvalues and eigenvectors. We present results for the largest eigenvalue and the corresponding principal eigenvector. These results are indicative of the overall accuracy. Results of similar quality are obtained for additional eigenvalues and eigenvectors as described in section 4. Moreover, results of similar quality are obtained for the case of performing StreamSVD on arbitrary subsets of streams, as discussed in section 4 We omit these results for brevity.

6.2 Accuracy and Space Tradeoff

In these experiments, algorithm NaiveSVD is applied to obtain the exact eigenvalues and eigenvectors. That is, sampling stream tuples in not enabled and thus the eigenvalues and eigenvectors computed are exact. Recall that StreamSVD makes use of a matrix $S_{s \times m}$ in accordance to lemma 1 as well as sampling. We vary the value of s in these experiments and observe the accuracy implications. Thus, we change the values of $\epsilon$ of our approximation, by changing the value of s. Larger s means smaller $\epsilon$ and vice versa. We use $n=10^3$ and $m=100$ in these experiments.

FIG. 5 provides plots of accuracy of approximation to exemplary eigenvalues and eigenvectors. FIG. 5(a) presents the AARE for the principal eigenvalue for the data sets used in out study. Increasing s improves accuracy in accordance to lemma 1. In the case of the Gaussian data set, the AARE appears high, since we expect no correlation between the streams. For data set Linear, the error is very low, and gradually increases as noise is added to the data set (data sets Linear-S to Linear-L). This, provides experimental evidence that algorithm StreamSVD is capable of preserving a good approximation to the principal eigenvalue, even for data sets artificially constructed to contain weak linear correlations, as in the case of Linear-L. In this case, as is evident in FIG. 5(a) the principal eigenvalue is at most 10% away from the real value. Accuracy is much better in all the other cases that linear correlations exist. In the case of data set Real, the error appears to be low, providing additional evidence that correlations exist in real data distributions. Moreover, the error drops quickly with increasing values of s, as dictated by lemma 1. Notice for even small s we are able to attain high accuracy for principal eigenvalues. This behavior was consistent throughout our experiments, with additional eigenvalues, not just the principal, we omit those experiments in interest of space.

Figure 5A:
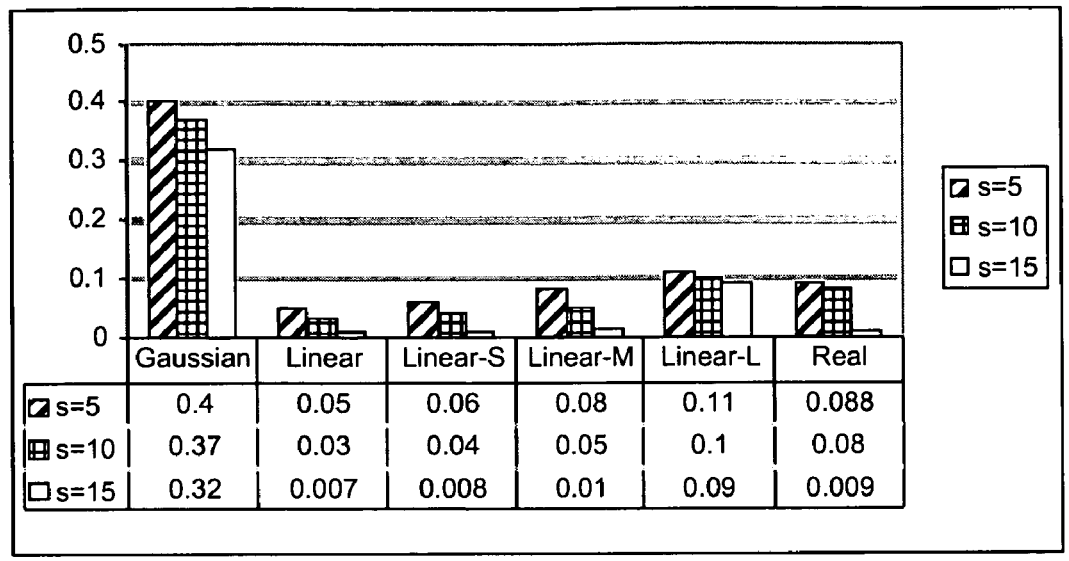
FIGS. 5(a)-(d) are plots of various exemplary accuracy measures for exemplary eigenvalues and eigenvectors computed with an exemplary embodiment of algorithm StreamSVD.
Figure 5B:
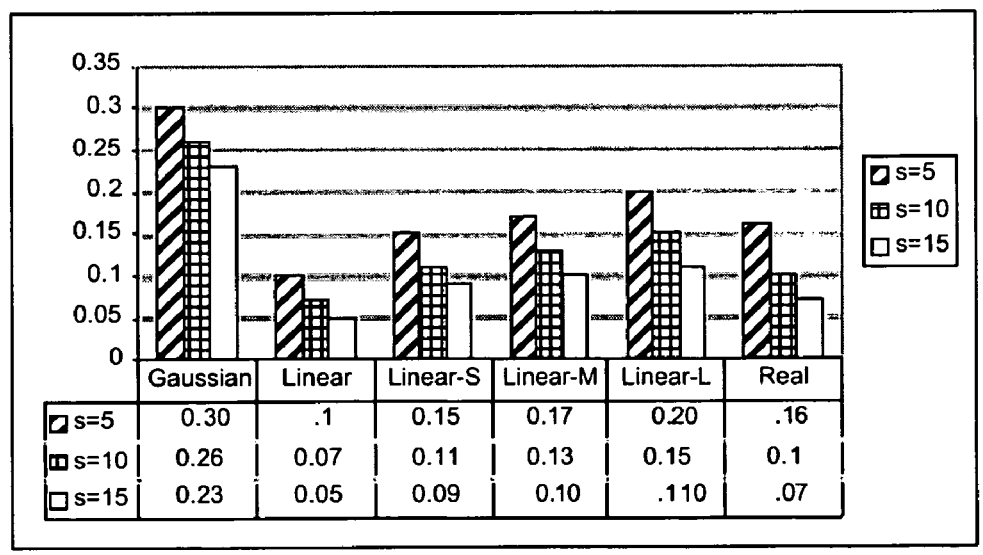

FIG. 5(b) presents the standard deviation of ARE as the value of s increases for the data sets used in our study. In all cases, the trends are related to those observed for AARE, with deviation tailing off for larger s values. Notably, in the case of data set Real, standard deviation appears very low, demonstrating the quality of the approximation our technique offers on real data sets as well.

Figure 5C:
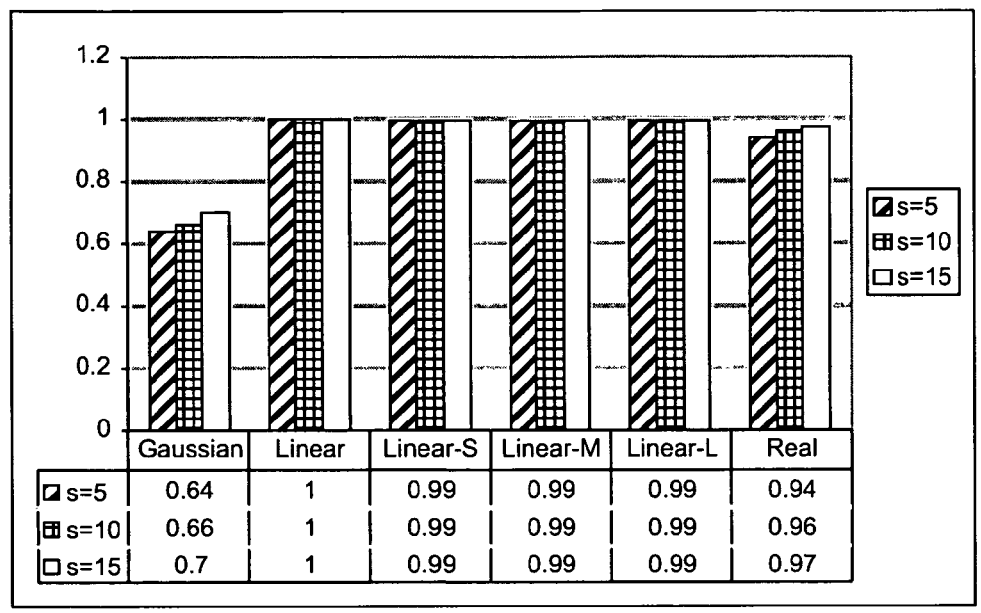
Figure 5D:
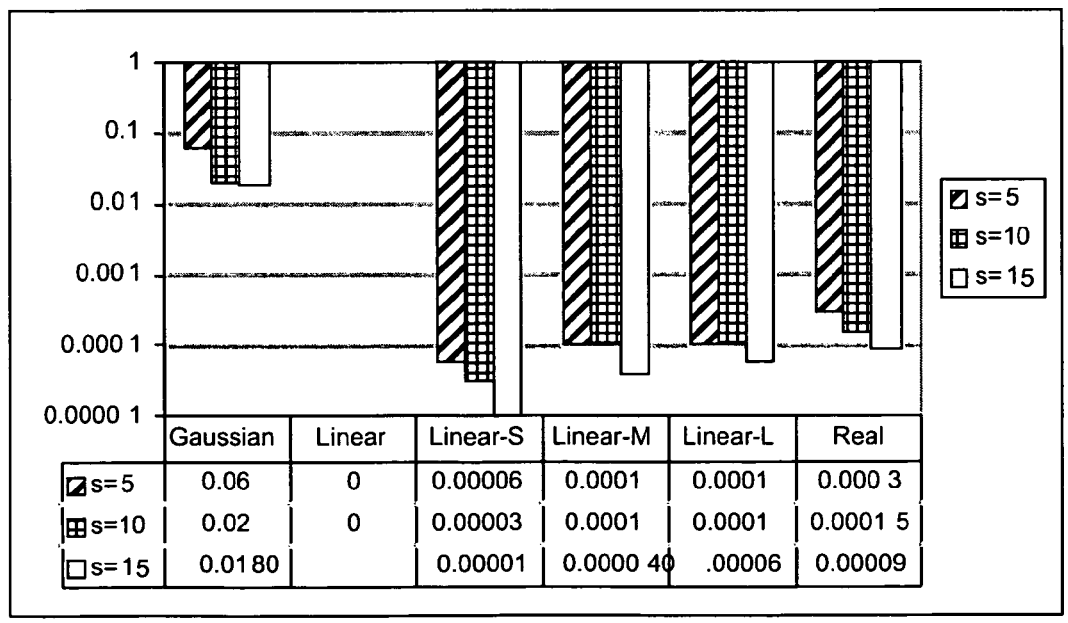

FIG. 5(c) presents the mean value of the inner product for the principal eigenvector computed with algorithm NaiveSVD and the principal eigenvector computed with algorithm StreamSVD. FIG. 5(d) presents the standard deviation of this product. For the case of data set Gaussian, the vectors appear far apart matching our expectation. In all other cases however, where some form of linear correlation exists between the underlying streams, algorithm StreamSVD is able to uncover it and the principal eigenvectors remain very close. For data set Real the reported quality of the principal eigenvector computed with StreamSVD is excellent, with precision increasing as a function of s. The standard deviation of this product (FIG. 5(d)) is very small as well. Thus, the quality of the approximation to the principal eigenvector reported, appears "stable" over time, i.e., as the data stream evolves. For the case of data set Linear, the vectors are essentially identical and appear to be nominally affected as noise is added to the data.

6.3 Performance Issues

The second set of experiments we report, evaluate the performance of algorithm StreamSVD compared with that of NaiveSVD. We report on the average time spent per stream tuple during the execution of the algorithms. This time consists of the time to update matrix M ($AA^T$ in the case of NaiveSVD and $AS^T$ in case of StreamSVD) as well as the time to perform SVD on M, if required, amortized over a large number of stream tuples (100K). In these experiments algorithm NaiveSVD employs sampling of stream tuples, as proposed in section 4, boosting its performance. The performance gain is arising out of the fact that we require O(m) time as opposed to $O(m^2)$ required by NaiveSVD to update the necessary matrices and not from sampling.

As far as performance is concerned two parameters are of interest; the number of streams involved m, as well as the value of s that affects the quality of the approximation.

Figure 6A:
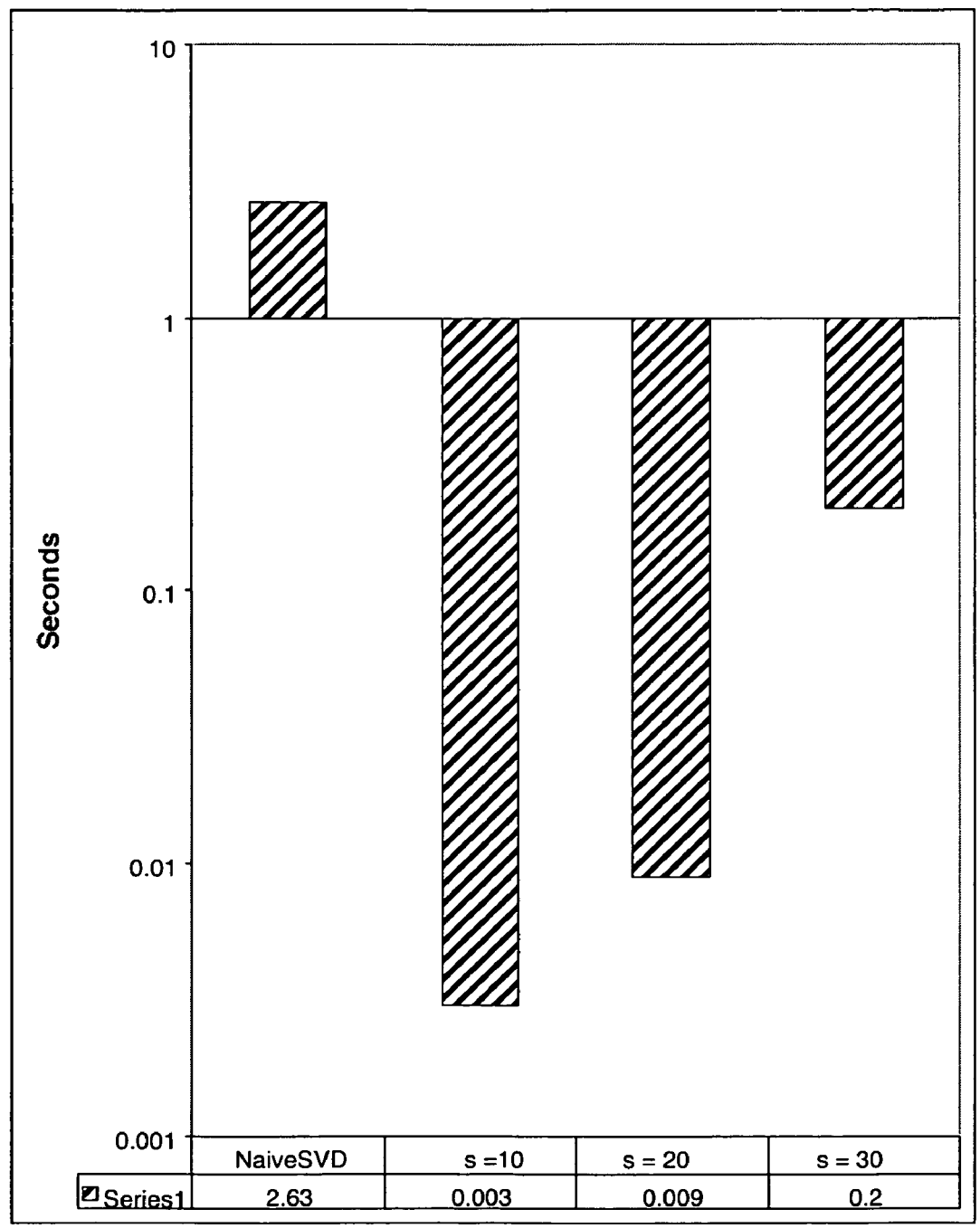
FIGS. 6(a) and (b) are plots of exemplary performance measures for an exemplary embodiment of algorithm StreamSVD.

Varying s: The results are presented in FIG. 6, in which is plotted the average time spend per stream tuple as the value of s increases, for various data sets, m=100. To summarize:

FIG. 6(a) presents the time per stream tuple for data set Gaussian, as s increases, for m=100 streams. Since there is no correlation between the streams, both algorithms compute the SVD for each new tuple arriving in the stream.

Figure 6B:
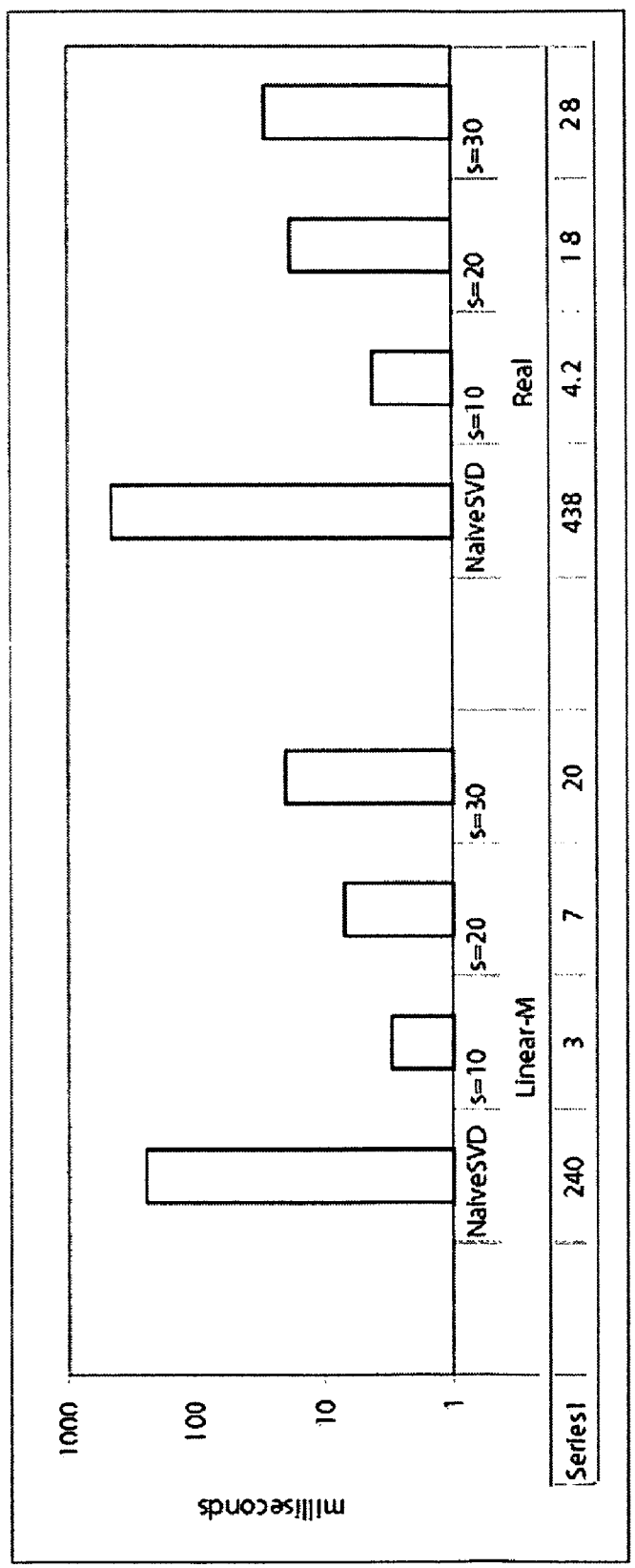
Figure 7A:
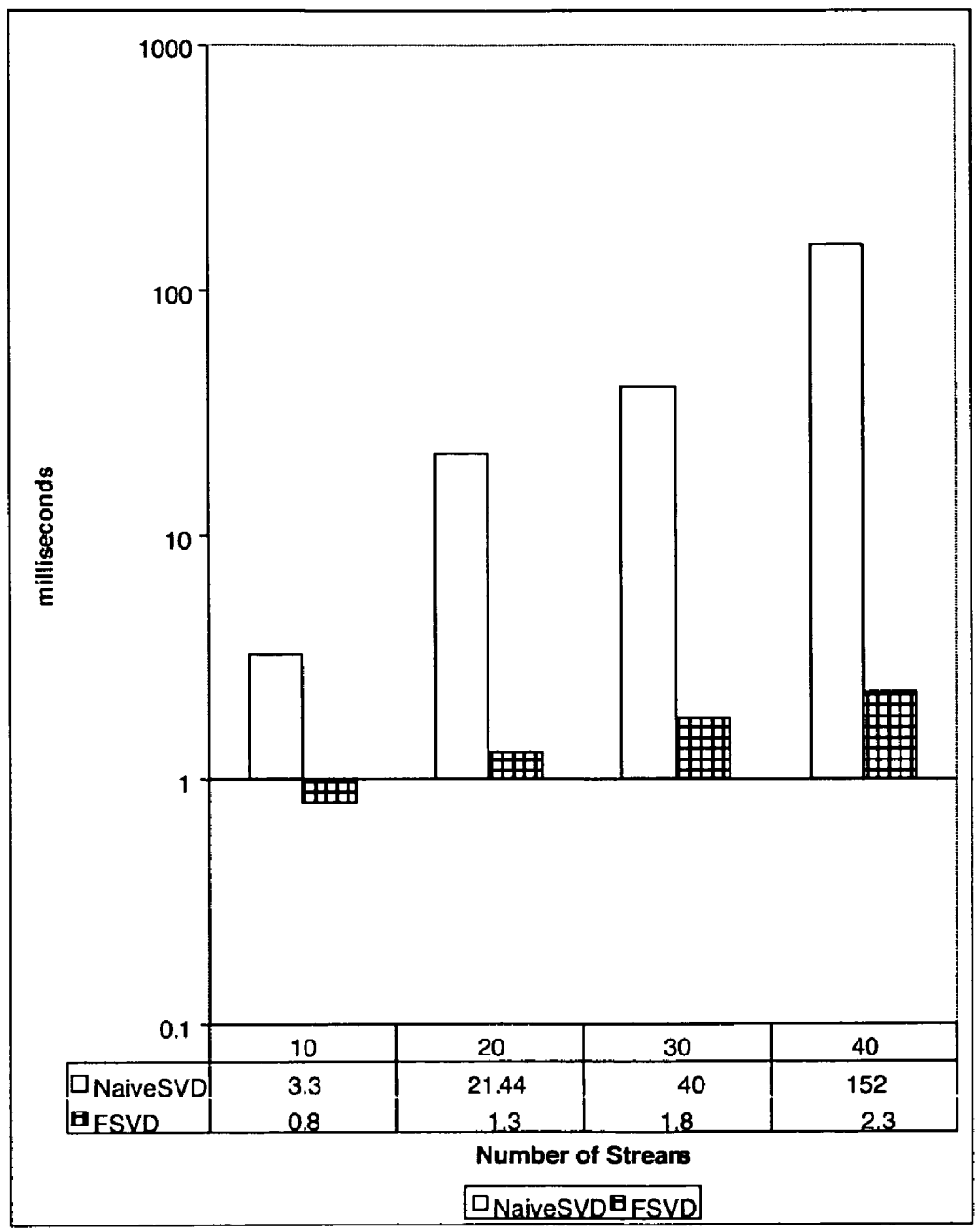
FIGS. 7(a)-(d) are plots of exemplary performance measures for an exemplary embodiment of algorithm StreamSVD.
Figure 7B:
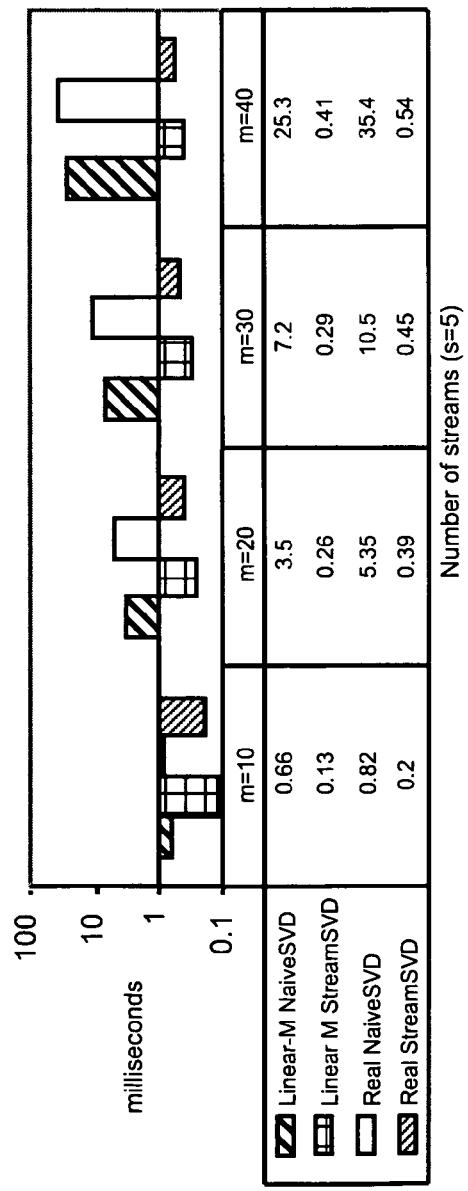
Figure 7D:
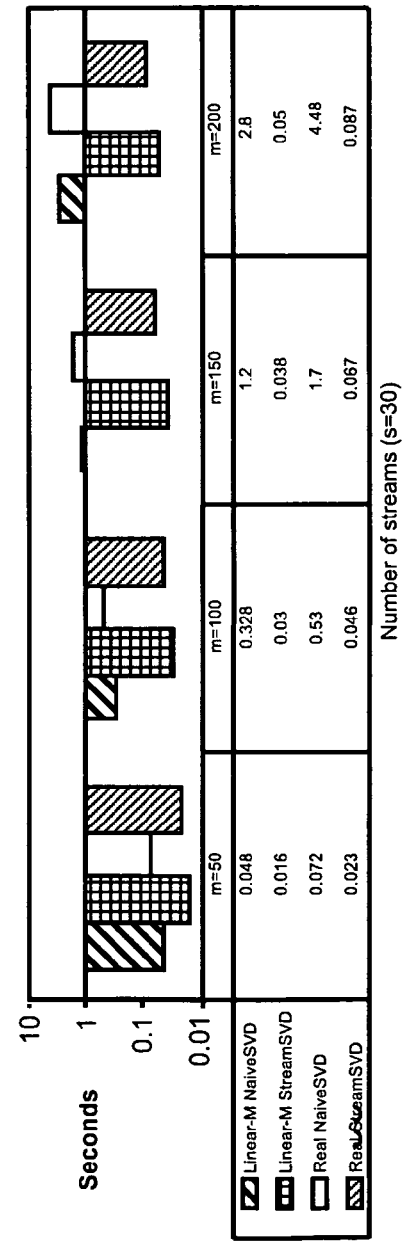
Figure 7C:
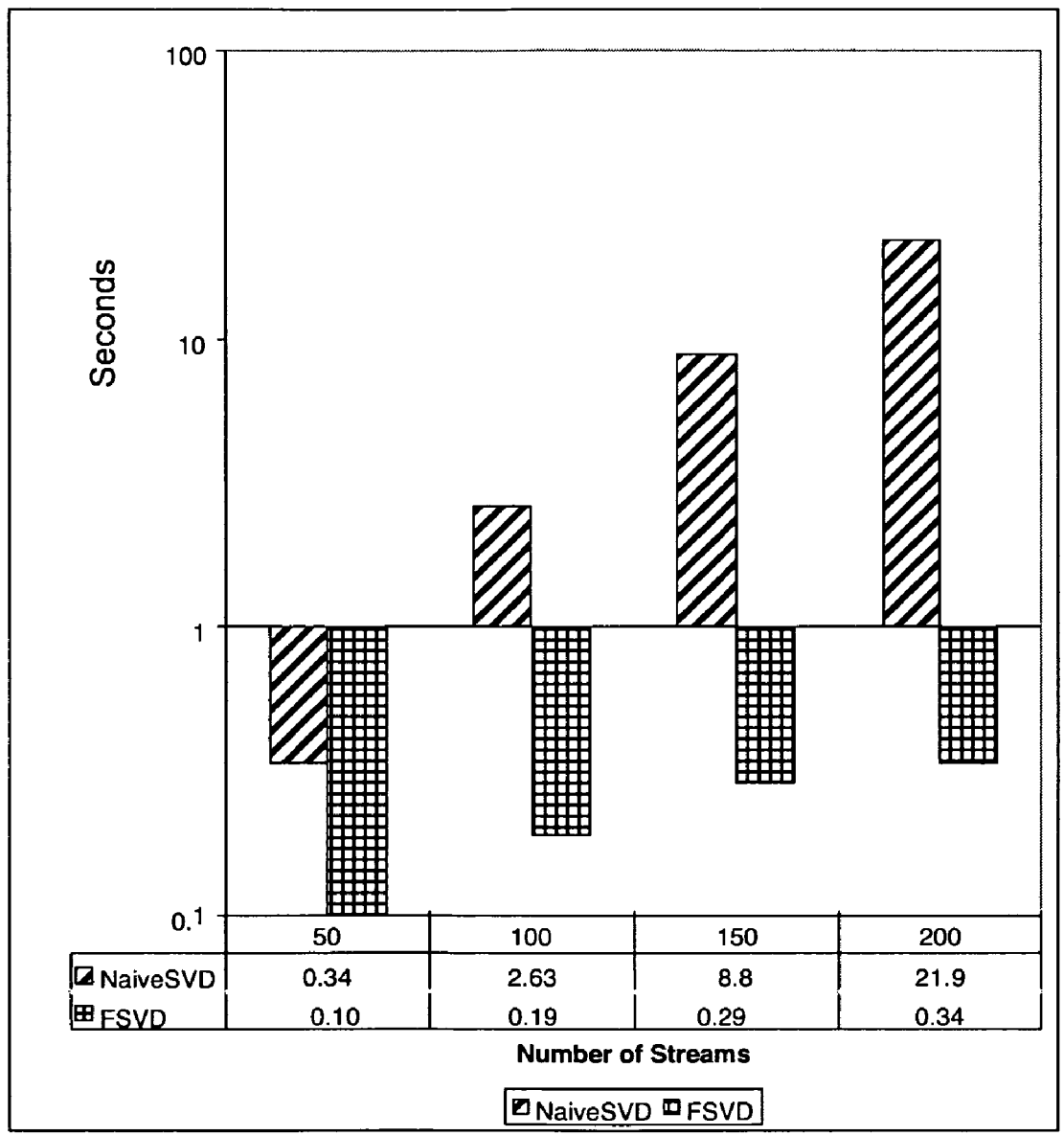

FIG. 6(b), presents the result of the same experiment for data sets Linear-M and Real. In this case, sampling is applied by both algorithms. The savings in response time per stream tuple achieved by StreamSVD, are profound.

Varying number of streams m: In FIG. 7 we present the results of a scalability experiment varying the number of streams m, by plotting an average time spent per stream tuple as the number of streams increases. We present both scenarios as s is small or sufficiently larger. In particular, FIGS. 7(a) and 7(b) vary the number of streams from 10 to 40 for a value of s=5, for data sets Gaussian, Linear-M and Real. Similarly, FIGS. 7(c) and 7(d) vary the number of streams from 50 to 200 for s=30 and for the same data sets.

The effects of sampling remain the same as in the experiment associated with FIG. 6; data set Gaussian forces SVD computation almost on every tuple. In contrast, in data sets Linear-M and Real sampling is utilized and we observe a clear performance benefit. For a specific value of s when we increase the number of streams, it is evident that the performance advantage of StreamSVD increases significantly. This trend can be observed both in the case of a small (FIGS. 7(a) and 7(b)) as well as a larger (FIGS. 7(c) and 7(d)).

To summarize, there are two main conclusions from our experiments with StreamSVD. First, the performance implications of the application of lemma 1 to StreamSVD can be considered to be profound. Even small values of s are enough to potentially provide excellent accuracy providing large savings in time spent per tuple to maintain the SVD in a stream context. Second, even for a small number of streams StreamSVD currently appears to be the algorithm of choice.

7. Conclusions

We considered the problem of identifying correlations between multiple data streams using Singular Value Decomposition. We have proposed one or more exemplary algorithms to maintain the SVD of multiple data streams and identify correlations between the streams. We have quantified the accuracy of our proposal both analytically and experimentally and through detailed experimental results using real and synthetic data sets evaluated its performance. We also presented a case study of the application of our technique to the problem of querying multiple data streams.

This study raises various issues for further research and exploration. The algorithms and techniques presented herein are likely to be of interest to other forms of computation over multiple streams. In particular, reasoning and mining dynamically multiple data streams is a problem of central interest in network data management. Identification of correlations between streams, via the proposed StreamSVD algorithm, can be a first step in designing mining procedures over multiple streams and/or advanced querying processing techniques, such as queries over arbitrary subsets of streams. We plan to investigate these directions in our future work.

Thus, certain exemplary embodiments provide a method comprising: automatically: receiving a plurality of elements for each of a plurality of continuous data streams; treating the plurality of elements as a first data stream matrix that defines a first dimensionality; reducing the first dimensionality of the first data stream matrix to obtain a second data stream matrix; computing a singular value decomposition of the second data stream matrix; and based on the singular value decomposition of the second data stream matrix, quantifying approximate linear correlations between the plurality of elements.

Figure 8:
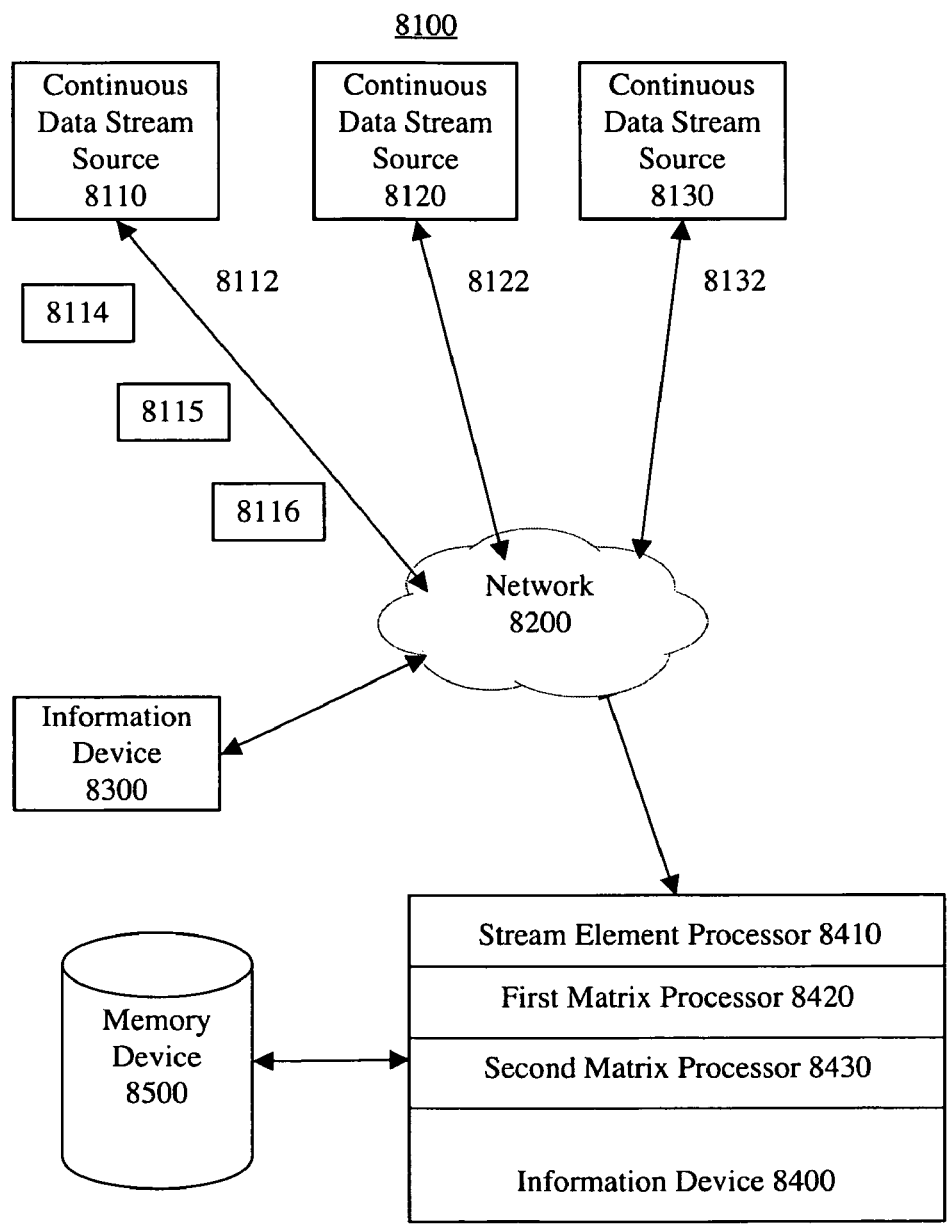
FIG. 8 is a block diagram of an exemplary embodiment of a telecommunications system 8000.

FIG. 8 is a block diagram of an exemplary embodiment of a telecommunications system 8000 that can implement an exemplary embodiment of the StreamSVD algorithm. System 8000 can comprise any number of continuous data stream sources 8100, such as continuous data stream sources 8110, 8120, 8130. Any continuous data stream source 8100 can be an information device. From any continuous data stream source 8110, 8120, 8130 can flow a continuous data stream 8112, 8122, 8132, respectively. Any continuous data stream can include any number of data stream elements, such as elements 8114, 8115, 8116 of continuous data stream 8112.

Any of the continuous data stream sources 8100 can be coupled to a network 8200. Coupled to network 8200 can be any number of information devices 8300 to which continuous data streams are directed. Coupled to network 8200 can be an information device 8400 which can identify linear correlations between data stream elements, and which can comprise a stream element processor 8410, a first matrix processor 8420, and a second matrix processor 8430. Coupled to information device 8400 can be a memory device 8500 that can store a first matrix, a second matrix, and/or linear correlations between data stream elements.

Figure 9:
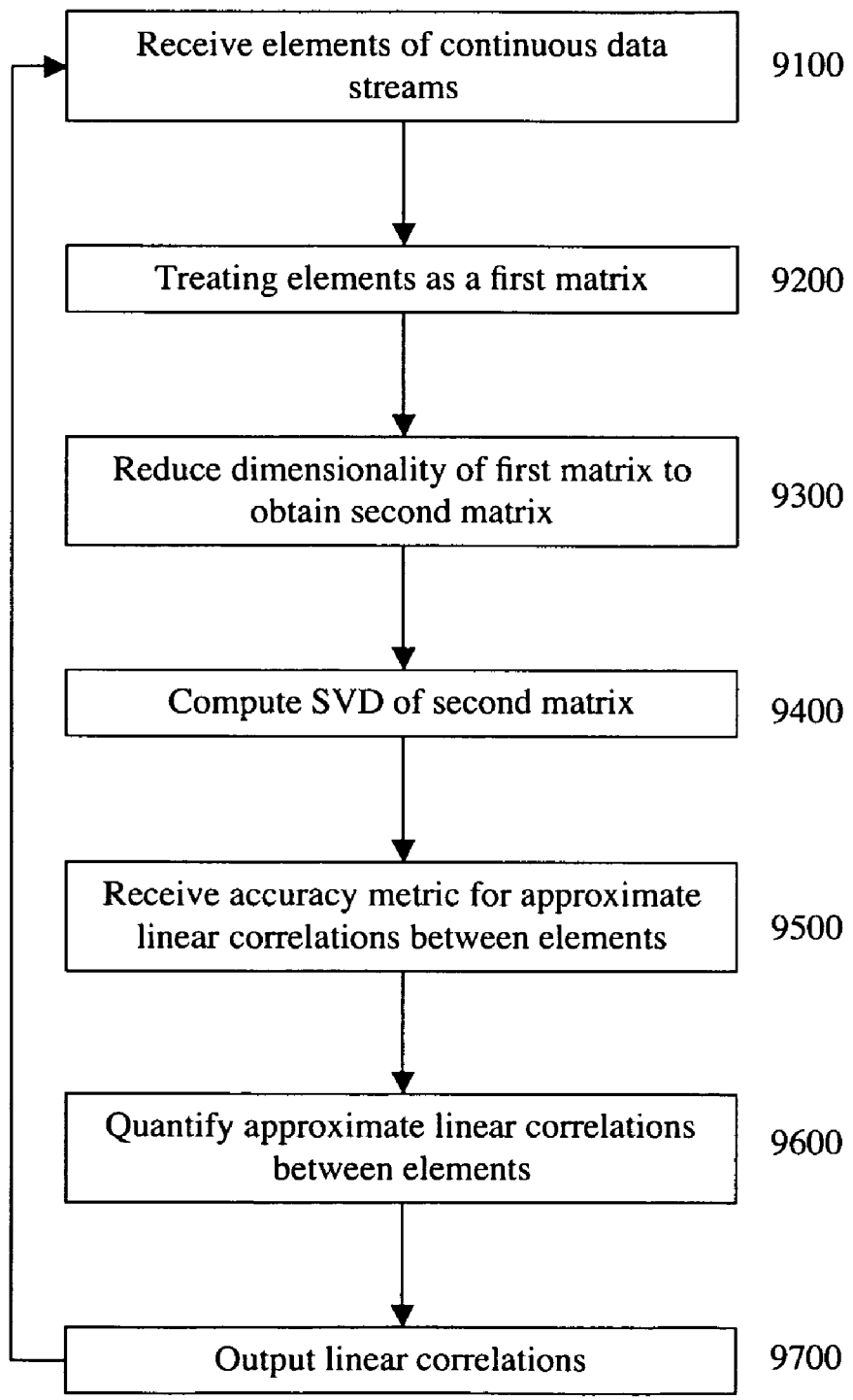
FIG. 9 is a flow diagram of an exemplary embodiment of a method 9000.

FIG. 9 is a flow diagram of an exemplary embodiment of a method 9000 for automatically implementing an exemplary embodiment of the StreamSVD algorithm. At activity 9100, elements of multiple continuous data streams can be received. The received elements can be actively sought and obtained or passively received. At activity 9200, the received elements can be treated as a first data stream matrix defining a first dimensionality. At activity 9300, the dimensionality of the first data stream matrix can be reduced to obtain a second data stream matrix. At activity 9400, a singular value decomposition of the second data stream matrix can be computed.

At activity 9500, a user-specified accuracy metric can be obtained, the accuracy metric related to the degree of approximation of linear correlations between elements of the continuous data streams. At activity 9600, based on the singular value decomposition of the second data stream matrix, approximate linear correlations between the plurality of elements can be quantified. The approximate linear correlations can meet the user-specified accuracy metric. At activity 9700, the approximate linear correlations between the plurality of elements can be output and/or reported. In certain exemplary embodiments, the approximate linear correlations can comprise a plurality of eigenvalues that approximate principal eigenvalues of the first data stream matrix. In certain exemplary embodiments, the approximate linear correlations can comprise a plurality of eigenvectors that approximate principal eigenvectors of the first data stream matrix.

In certain exemplary embodiments, any portion of method 9000 can be repeated in any defined manner, including periodically, pseudo-randomly, and randomly. In certain exemplary embodiments, any portion of method 9000 can occur dynamically.

In certain exemplary embodiments, at least one of the plurality of continuous data streams can be synchronous, asynchronous, bursty, sparse, and/or contain out-of-order elements.

In certain exemplary embodiments, the reducing activity can apply the Johnson-Lindenstrauss Lemma.

Figure 10:
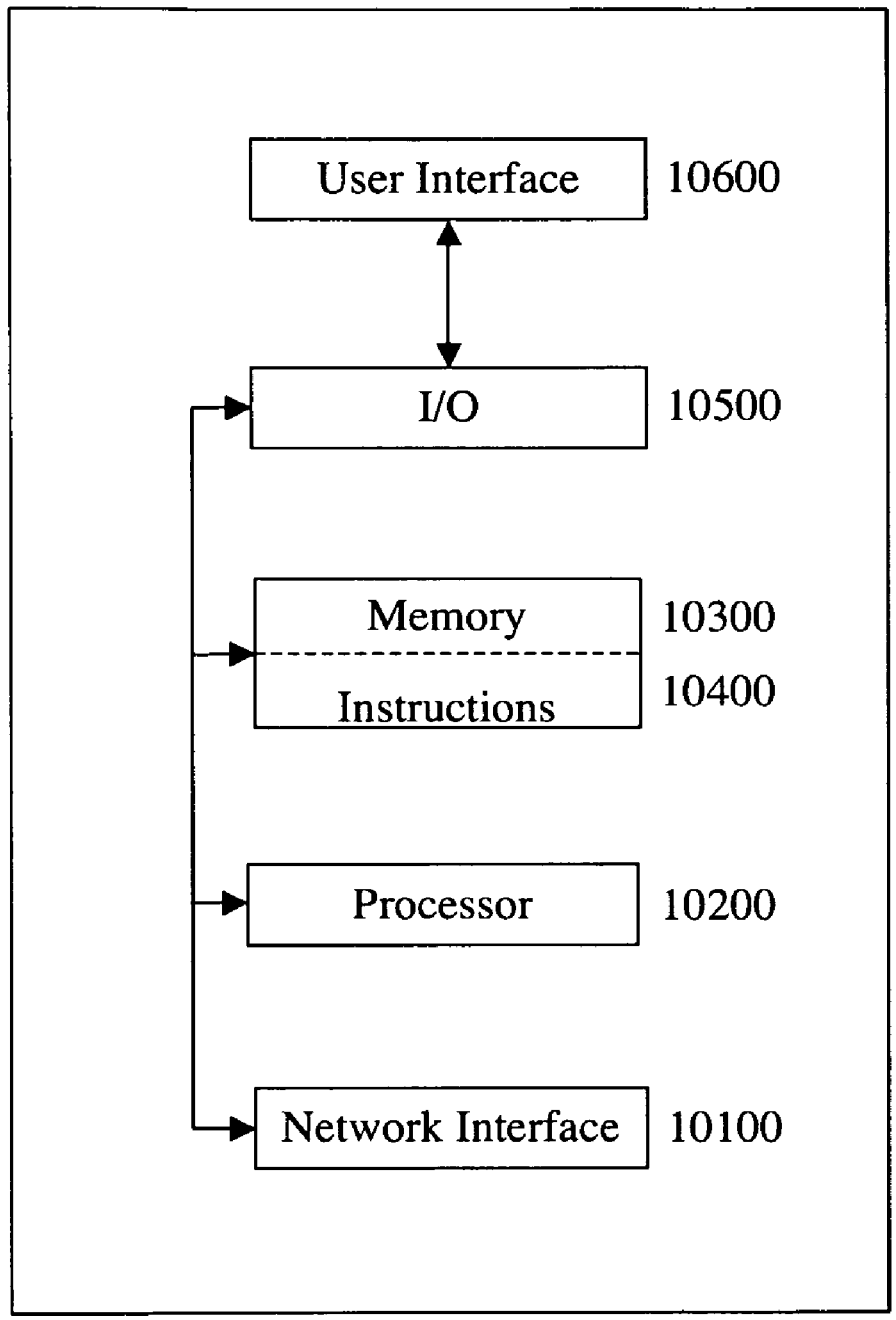
FIG. 10 is a block diagram of an exemplary embodiment of an information device 10000.

FIG. 10 is a block diagram of an exemplary embodiment of an information device 10000, which in certain operative embodiments can represent, for example, continuous data stream source 8100, information device 8300, and/or information device 8400 of FIG. 8. Information device 10000 can comprise any of numerous well-known components, such as for example, one or more network interfaces 10100, one or more processors 10200, one or more memories 10300 containing instructions 10400, one or more input/output (I/O) devices 10500, and/or one or more user interfaces 10600 coupled to I/O device 10500, etc.

In certain exemplary embodiments, via one or more user interfaces 10600, such as a graphical user interface, a user can implement an exemplary embodiment of the StreamSVD algorithm.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of the appended claims. For example, regardless of the content of any portion (e.g., title, field, background, summary, abstract, drawing figure, etc.) of this application, unless clearly specified to the contrary, there is no requirement for the inclusion in any claim of the application of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render a claim invalid, then any such conflicting information in such incorporated by reference material is specifically not incorporated by reference herein.

References

The following references are incorporated by reference herein in their entirety:

1. N. Alon, Y. Matias, and M. Szegedy, "The space complexity of approximating the frequency moments", Proceedings of the Symposium on Theory of Computing, 1996, pages 20-29.
2. Brian Babcock, and Mayur Datar, and Rajeev Motwani, "Sampling From a Moving Window Over Streaming Data", 2002, SODA.
3. S. Babu and J. Widom, "Continuous Queries Over Data Streams", September 2001, SIGMOD Record.
4. D. Barbara, C. Faloutsos, J. Hellerstein, Y. Ioannidis, H. V. Jagadish, T. Johnson, R. Ng, V. Poosala, K. Ross, and K. C. Sevcik, "The New Jersey Data Reduction Report", Sep. 1996, Data Engineering Bulletin.
5. Yixin Chen, Guozhu Dong, Jiawei Han, B. Wah, and J. Wang, "Multidimensional Regression Analysis of Time Series Data Streams", 2002, Proceedings of VLDB.
6. M. Datar, A. Gionis, P. Indyk, and R. Motwani, "Maintaining Stream Statistics over Sliding Windows", SODA, 2002.
7. J. Demmel, "Applied Numerical Linear Algebra", 1997, Society of Industrial and Applied Mathematics.
8. P. Drineas, R. Kannan, A. Frieze, V. Vinay, "Clustering in Large Graphs and Matrices", SODA, 1999.
9. A. Frieze, R. Kannan, and S. Vempala, "Fast Monte-Carlo Algorithms for Finding Low-Rank Approximations", FOCS, 1998.
10. V. Ganti, J. Gehrke, and R. Ramakrishnan, "Mining and Monitoring Evolving Data", Knowledge and Data Engineering, Vol. 13, No. 1, pages 50-63, 2001.
11. L. Gao and X. Wang, "Continually Evaluating Similarity Based Pattern Queries on a Streaming Time Series", 2002, Proceedings of ACM SIGMOD.
12. J. Gerhke, F. Korn, and D. Srivastava, "Correlated Aggregate Queries Over Continual Data Streams", May 2001, Proceedings of ACM SIGMOD.
13. A. Gilbert, S. Guha, P. Indyk, Y. Kotadis, S. Muthukrishnan, and M. Strauss, "Fast, Small-Space Algorithms for Approximate Histogram Maintenance", 2002, STOC.
14. A. Gilbert, Y. Kotidis, S. Muthukrishnan, and M. Strauss, "How to Summarize the Universe: Dynamic Maintenance of Quantiles", Proceedings of the International Conference on Very Large Databases VLDB, 2002.
15. J. Gray, P. Sundaresan, S. Englert, K. Baclawski, and P. Weinberger, "Quickly Generating a Billion-Record Synthetic Database", June 1994, Proceesings of ACM SIGMOD, pages 243-252.
16. M. Greenwald and S. Khanna, "Space-Efficient Online Computation of Quantile Summaries", May 2001, Proceedings of ACM SIGMOD, Santa Barbara.
17. S. Guha and N. Koudas, "Approximating a Data Stream for Querying and Estimation: Algorithms and Performance Evaluation", February 2002, ICDE.
18. S. Guha, N. Koudas, and K. Shim, "Data Streams and Histograms", July 2001, Symposium on the Theory of Computing, STOC.
19. M. Henzinger, P. Raghavan, S. Rajagopalan, "Computing on Data Streams", August 1997, Digital Equipment Corporation, TR-1998-011.
20. W. B. Johnson and J. Lindenstrauss, "Extensions of Lipshitz Mapping Into Hilbert Space", May 1984, Contemporary Mathematics, Vol. 26, pages 189-206.
21. Kothuri Venkata Ravi Kanth and A. Singh, "Dimensionality Reduction For Similarity Searching In Dynamic Databases", June 1998, Proceedings of ACM SIGMOD, pages 97-105.
22. F. Korn, H. V. Jagadish, and C. Faloutsos, "Efficiently Supporting Ad Hoc Queries in Large Datasets of Time Sequences", May 1997, Proceedings of ACM SIGMOD, Tuscon Ariz., pages 289-300.
23. S. Madden and M. Franklin, "Fjording the Stream: An Architecture for Queries Over Streaming Sensor Data", February 2002, Proceedings of ICDE.
24. Y. Mattias, J. S. Vitter, and M. Wang, "Dynamic Maintenance of Wavelet-Based Histograms", September 2000, Proceedings of the International Conference on Very Large Databases, VLDB, Cairo, Egypt, pages 101-111.
25. J. Munro and M. Paterson, "Selection and Sorting with Limited Storage", 1980, Theoretical Computer Science, pages 315-323.
26. G. Singh, S. Rajagopalan, and B. Lindsay, "Random Sampling Techniques For Space Efficient Computation Of Large Datasets", June 1999, Proceedings of SIGMOD, Philadelphia, Pa., pages 251-262.
27. G. Singh, S. Rajagopalan, and B. Lindsay, "Approximate Medians and Other Quantiles In One Pass and With Limited Memory", June 1998, Proceedings of ACM SIGMOD, pages 426-435.
28. John W. Stewart, III, "Inter-domain Routing in the Internet", Addison-Wesley, Reading, Mass., pages xiii and 137, 1999.
29. N. Thaper, S. Guha, P. Indyk, and N. Koudas, "Dynamic Multidimensional Histograms", SIGMOD, 2002.
30. B. K. Yi and C. Faloutsos, "Fast Time Sequence Indexing for Arbitrary Lp Norms", September 2000, Proceedings of VLDB, Cairo, Egypt.
31. Y. Zhu and D. Shasha, "StatStream: Statistical Monitoring of Thousands of Streams in Real Time", 2002, Proceedings of VLDB.

What is claimed is:

1. A method comprising:
    detecting a denial of service attack based upon quantified approximate linear correlations between a plurality of elements determined via randomly computed singular value decomposition of a first data stream matrix by utilizing a processor, wherein the first data stream matrix is obtained via a reduction of a dimensionality of a second data stream matrix, wherein the first data stream matrix comprises a plurality of sampled values of the second data stream matrix, wherein the second data stream matrix is based upon a plurality of elements of each of a plurality of continuous data streams; and
    generating a report of a detection of the denial of service attack by utilizing the processor, wherein the denial of service attack does not involve address spoofing.

2. The method of claim 1, further comprising storing the plurality of elements as a collection of hash functions.

3. The method of claim 1, wherein
    at least one of the plurality of continuous data streams is synchronous.

4. The method of claim 1, wherein
    at least one of the plurality of continuous data streams is asynchronous.

5. The method of claim 1, wherein
    at least one of the plurality of continuous data streams comprises out of order elements.

6. The method of claim 1, further comprising
    obtaining values for the first data stream matrix from a Gaussian distribution and preserving relative distances between vectors in a resulting space of the first data stream matrix as compared to the second data stream matrix, the first matrix determined via a sliding window stream model.

7. The method of claim 1, further comprising
repeatedly computing the singular value decomposition in response to a change in the first data stream matrix caused by additional data sampled from a data stream of the plurality of continuous data streams.
8. The method of claim 1, further comprising
periodically computing the singular value decomposition in response to an expiration of entries in the second data stream matrix.
9. The method of claim 1, further comprising
randomly computing the singular value decomposition.
10. The method of claim 1, further comprising
quantifying the approximate linear correlations in response to a sliding window stream that varies over time.
11. The method of claim 1, wherein
the approximate linear correlations comprise a plurality of eigenvalues that approximate principal eigenvalues of the second data stream matrix.
12. The method of claim 1, wherein
the approximate linear correlations comprise a plurality of eigenvectors that approximate principal eigenvectors of the second data stream matrix.
13. The method of claim 1, further comprising receiving a user-specified accuracy metric for the approximate linear correlations.
14. The method of claim 1, wherein
the approximate linear correlations meet a user-specified accuracy metric.
15. The method of claim 1, further comprising
outputting the approximate linear correlations.
16. The method of claim 1, further comprising
reporting the approximate linear correlations.
17. A method comprising:
determining a plurality of elements via a randomly computed singular value decomposition of a first data stream matrix by utilizing a processor, wherein the first data stream matrix is obtained via a reduction of a dimensionality of a second data stream matrix, wherein the second data stream matrix is based upon a plurality of elements of each of a plurality of continuous data streams;
determining a probability of computation based upon a ratio of a magnitude of a sampled value of a plurality of sampled values to a calculated product of a determined separating value of eigenvalues and a determined eigenvalue of the first data stream matrix by utilizing the processor; and
applying a sound filter to a multimedia application, based upon a quantified approximate linear correlation between the plurality of elements determined via the randomly computed singular value decomposition and upon the probability of computation.
18. A method comprising:
determining a plurality of elements via a randomly computed singular value decomposition of a first data stream matrix by utilizing a processor, wherein the first data matrix is obtained via a reduction of a dimensionality of a second data stream matrix, wherein the second data stream matrix is based upon a plurality of elements of each of a plurality of continuous data streams; and
detecting a denial of service attack not involving address spoofing by utilizing the processor, wherein the denial of service attack is detected based upon quantified approximate linear correlation between the plurality of elements determined via the randomly computed singular value decomposition.

* * * * *